US009697580B2

(12) United States Patent
Li et al.

(10) Patent No.: US 9,697,580 B2
(45) Date of Patent: Jul. 4, 2017

(54) DYNAMIC PIPELINE FOR GRAPHICS PROCESSING

(71) Applicant: QUALCOMM Incorporated, San Diego, CA (US)

(72) Inventors: Liang Li, San Diego, CA (US); Andrew Evan Gruber, Arlington, MA (US); Guofang Jiao, San Diego, CA (US); Zhenyu Qi, Auburndale, MA (US); Gregory Steve Pitarys, Stow, MA (US); Scott William Nolan, Holliston, MA (US)

(73) Assignee: QUALCOMM Incorporated, San Diego, CA (US)

( * ) Notice: Subject to any disclaimer, the term of this patent is extended or adjusted under 35 U.S.C. 154(b) by 348 days.

(21) Appl. No.: 14/537,589

(22) Filed: Nov. 10, 2014

(65) Prior Publication Data

US 2016/0132987 A1    May 12, 2016

(51) Int. Cl.
*G06T 1/20* (2006.01)
*G09G 5/18* (2006.01)

(52) U.S. Cl.
CPC .................. *G06T 1/20* (2013.01); *G09G 5/18* (2013.01); *G09G 2330/022* (2013.01)

(58) Field of Classification Search
CPC ......... G06T 1/20; G06T 1/60; G06T 2210/52; G09G 5/363; G09G 2360/06; G06F 9/3851; G06F 9/3887; G06F 2212/302; G06F 9/30072; G06F 9/3885; G06F 9/3009; G06F 9/3869; G06F 9/3873; G06F 12/0607; G06F 9/3005; G06F 9/30145; G06F 9/30181; G06F 9/322; G06F 9/325; G06F 9/3875; G06F 9/46; G06F 9/52; G06F 9/542; G06F 12/1483; G06F 15/17325; G06F 9/3828; G06F 9/3859; G06F 9/3867; G06F 9/4806
See application file for complete search history.

(56) References Cited

U.S. PATENT DOCUMENTS

| 4,760,519 A | 7/1988 | Papworth et al. |
| 5,043,868 A | 8/1991 | Kitamura et al. |
| 5,555,384 A | 9/1996 | Roberts et al. |

(Continued)

OTHER PUBLICATIONS

Lee, Je-Hoon, and Kyoung-Rok Cho. "Design of a high performance self-timed ARM9 processor." IEICE Electronics Express 5.3 (2008): 87-93.*

(Continued)

*Primary Examiner* — Sultana M Zalalee
(74) *Attorney, Agent, or Firm* — Shumaker & Sieffert, P.A.

(57) ABSTRACT

This disclosure describes an apparatus configured to process graphics data. The apparatus may include a fixed hardware pipeline configured to execute one or more functions on a current set of graphics data. The fixed hardware pipeline may include a plurality of stages including a bypassable portion of the plurality of stages. The apparatus may further include a shortcut circuit configured to route the current set of graphics data around the bypassable portion of the plurality of stages, and a controller positioned before the bypassable portion of the plurality of stages, the controller configured to selectively route the current set of graphics data to one of the shortcut circuit or the bypassable portion of the plurality of stages.

30 Claims, 16 Drawing Sheets

(56) References Cited

U.S. PATENT DOCUMENTS

| | | | |
|---|---|---|---|
| 5,778,250 A | 7/1998 | Dye | |
| 5,964,866 A | 10/1999 | Durham et al. | |
| 6,412,061 B1 | 6/2002 | Dye | |
| 6,490,674 B1* | 12/2002 | Arnold | G06F 9/3836 712/216 |
| 6,587,940 B1* | 7/2003 | Soltis, Jr. | G06F 9/3838 711/125 |
| 7,385,609 B1 | 6/2008 | Lindholm et al. | |
| 7,836,326 B2* | 11/2010 | Shimada | G06F 1/3203 713/320 |
| 8,806,181 B1 | 8/2014 | O'Bleness et al. | |
| 2004/0068640 A1* | 4/2004 | Jacobson | G06F 1/3203 712/220 |
| 2005/0253857 A1 | 11/2005 | Hutchins et al. | |
| 2009/0138674 A1 | 5/2009 | Chang et al. | |
| 2010/0217961 A1 | 8/2010 | Hosoda | |
| 2012/0084540 A1* | 4/2012 | Lichtensteiger | G06F 9/3869 712/244 |
| 2013/0212352 A1* | 8/2013 | Anderson | G06F 9/3869 712/1 |
| 2014/0176578 A1 | 6/2014 | Meixner | |
| 2016/0014421 A1* | 1/2016 | Cote | G06T 1/20 382/170 |

OTHER PUBLICATIONS

Boucaron, Julien, and Anthony Coadou. Dynamic Variable Stage Pipeline: an Implementation of its Control. Diss. INRIA, 2009.*
International Search Report and Written Opinion from International Application No. PCT/US2015/055767, dated Mar. 8, 2016, 12 pp.
Hennessy J.L., "Pipelining: Basic and Intermediate Concepts", In: "Computer Architecture: A Quantative Approach", Jan. 1, 2007 (Jan. 1, 2007), Morgan Kaufmann, San Francisco, USA, XP55333203, ISBN: 978-0-12-370490-0, pp. A.1-A.77.
Response to Second Written Opinion dated Nov. 9, 2016, from International Application No. PCT/US2015/055767, filed on Dec. 21, 2016, 6 pp.
International Preliminary Report on Patentability from International Application No. PCT/US2015/055767, dated Feb. 6, 2017, 9 pages.
Response to Written Opinion dated Mar. 8, 2016, from International Application No. PCT/US2015/055767, filed on Jun. 16, 2016, 5 pp.
Second Written Opinion from International Application No. PCT/US2015/055767, dated Nov. 9, 2016, 6 pp.

* cited by examiner

DYNAMIC PIPELINE FOR GRAPHICS PROCESSING

TECHNICAL FIELD

This disclosure relates to graphics processing.

BACKGROUND

Visual content for display, such as content for graphical user interfaces and video games, may be generated by a graphics processing unit (GPU). A GPU may convert two-dimensional or three-dimensional (3D) objects into a two-dimensional (2D) pixel representation that may be displayed. Converting information about 3D objects into a bit map that can be displayed is known as pixel rendering, and requires considerable memory and processing power. In the past, 3D graphics capability was available only on powerful workstations. However, now 3D graphics accelerators are commonly found in personal computers (PC), as well as in embedded devices, such as smart phones, tablet computers, portable media players, portable video gaming consoles, and the like. Typically, embedded device have less computational power and memory capacity as compared to conventional PCs. As such, increased complexity in 3D graphics rendering techniques presents difficulties when implementing such techniques on an embedded system.

SUMMARY

This disclosure describes techniques for processing graphics data with a fixed hardware pipeline. In particular, this disclosure describes apparatuses and techniques for selectively routing graphics data to either bypassable stages of a fixed hardware pipeline, or to a shortcut circuit that routes graphics data around the bypassable stages.

In one or more examples of this disclosure, a controller may be configured to route a current set of graphics data based on one or more different criteria. The criteria may include a current instruction for the current set of graphics data, instructions for a subsequent set of graphics data, and an indication of whether or not the bypassable stages are currently processing other graphics data. In this way, the example apparatuses and techniques of this disclosure may selectively route graphics data through or around bypassable stages while maintaining in-order execution, and also providing for improved data latency, power consumption, and chip area cost.

In one example of the disclosure, an apparatus configured to process graphics data comprises a fixed hardware pipeline configured to execute one or more functions on a current set of graphics data, the fixed hardware pipeline comprising a plurality of stages including a bypassable portion of the plurality of stages, a shortcut circuit configured to route the current set of graphics data around the bypassable portion of the plurality of stages, and a controller positioned before the bypassable portion of the plurality of stages, the controller configured to selectively route the current set of graphics data to one of the shortcut circuit or the bypassable portion of the plurality of stages.

In another example of the disclosure, a method for processing graphics data comprises processing a current set of graphics data with a fixed hardware pipeline configured to execute one or more functions on the current set of graphics data, the fixed hardware pipeline comprising a plurality of stages including a bypassable portion of the plurality of stages, and a shortcut circuit configured to route the current set of graphics data around the bypassable portion of the plurality of stages, and selectively routing, with a controller positioned before the bypassable portion of the plurality of stages, the current set of graphics data to one of the shortcut circuit or the bypassable portion of the plurality of stages.

In another example of the disclosure, an apparatus configured to process graphics data comprises means for processing a current set of graphics data with a fixed hardware pipeline configured to execute one or more functions on the current set of graphics data, the fixed hardware pipeline comprising a plurality of stages including a bypassable portion of the plurality of stages, and a shortcut circuit configured to route the current set of graphics data around the bypassable portion of the plurality of stages, and means for selectively routing the current set of graphics data to one of the shortcut circuit or the bypassable portion of the plurality of stages.

In another example, this disclosure describes a computer-readable storage medium storing instructions that, when executed, cause one or more processors of a device configured to process graphics data to process a current set of graphics data with a fixed hardware pipeline configured to execute one or more functions on the current set of graphics data, the fixed hardware pipeline comprising a plurality of stages including a bypassable portion of the plurality of stages, and a shortcut circuit configured to route the current set of graphics data around the bypassable portion of the plurality of stages, and selectively route the current set of graphics data to one of the shortcut circuit or the bypassable portion of the plurality of stages.

The details of one or more examples of the disclosure are set forth in the accompanying drawings and the description below. Other features, objects, and advantages of the disclosure will be apparent from the description and drawings, and from the claims.

DETAILED DESCRIPTION

Many graphics processing techniques are executed using a fixed hardware pipeline. That is, rather than using a programmable processing unit with an associated arithmetic logic unit (ALU), one or more functions may be executed using a series of fixed hardware logic units. Fixed hardware pipelines lack the flexibility of programmable processing units because the function(s) a fixed hardware pipeline performs cannot be changed. However, fixed hardware pipelines generally perform functions much faster than functions may be performed using a programmable processing unit.

Rather than having multiple fixed pipelines for each function or combination of functions that are desired to be executed using hardware logic units, many graphics processing units (GPUs) are configured with fixed hardware pipelines that include hardware logic units for more than one function. In this arrangement, particular stages (i.e., one or more hardware logic units) of the fixed hardware pipeline may not be needed (i.e., bypassed) to perform a certain function. This is because the bypassed stages are used for other, different functions.

Current techniques for implementing fixed hardware pipelines that include one or more bypassable stages exhibit drawbacks in terms of power consumption, chip area cost, and data latency. In view of these drawbacks, this disclosure describes apparatuses and techniques for processing graphics data with a fixed hardware pipeline. In particular, this disclosure describes apparatuses and techniques for selectively routing graphics data to either bypassable stages of a fixed hardware pipeline, or to a shortcut circuit that routes graphics data around the bypassable stages.

In one or more examples of this disclosure, a controller may be configured to route a current set of graphics data based on one or more different criteria. The criteria may include a current instruction for the current set of graphics data, instructions for a subsequent set of graphics data, and an indication of whether or not the bypassable stages are currently processing other graphics data. In this way, the example apparatuses and techniques of this disclosure may selectively route graphics data through or around bypassable stages while maintaining in-order execution, and also providing for improved data latency, power consumption, and chip area cost.

Figure 1:
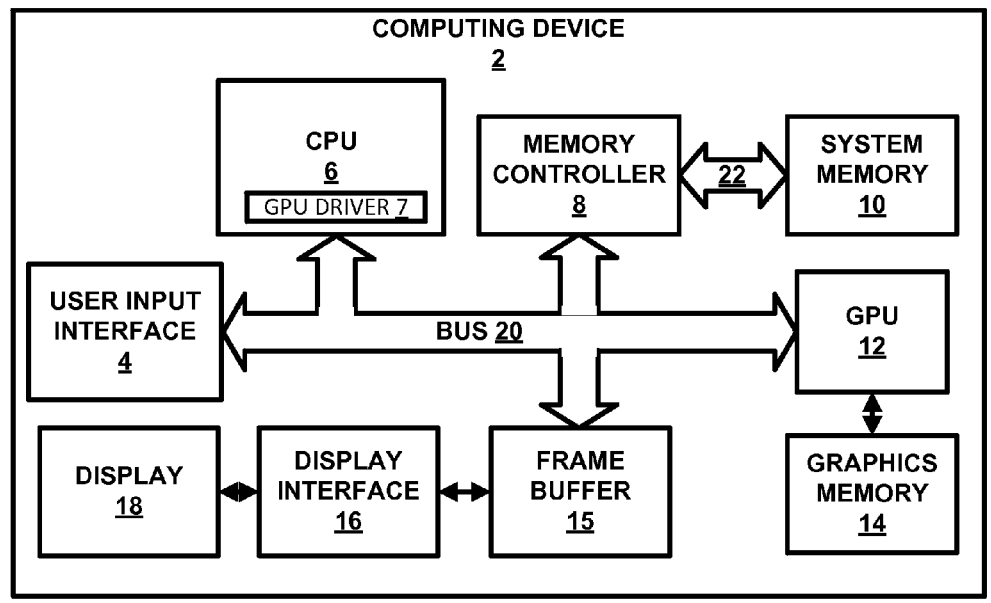
FIG. 1 is a block diagram showing an example computing device configured to use the techniques of this disclosure.

FIG. 1 is a block diagram illustrating an example computing device 2 that may use the dynamic fixed pipeline and associated techniques of this disclosure. Computing device 2 may comprise, for example, a personal computer, a desktop computer, a laptop computer, a tablet computer, a computer workstation, a video game platform or console, a mobile telephone such as, e.g., a cellular or satellite telephone, a landline telephone, an Internet telephone, a handheld device such as a portable video game device or a personal digital assistant (PDA), a personal music player, a video player, a display device, a television, a television set-top box, a server, an intermediate network device, a mainframe computer, any mobile device, or any other type of device that processes and/or displays graphical data.

As illustrated in the example of FIG. 1, computing device 2 may include user input interface 4, central processing unit (CPU) 6, memory controller 8, system memory 10, GPU 12, graphics memory 14, display interface 16, display 18 and buses 20 and 22. Note that in some examples, graphics memory 14 may be "on-chip" with GPU 12. In some cases, CPU 6, memory controller 8, GPU 12, and graphics memory 14, and possibly display interface 16 shown in FIG. 1 may be on-chip, for example, in a system on a chip (SoC) design. User input interface 4, CPU 6, memory controller 8, GPU 12 and display interface 16 may communicate with each other using bus 20. Memory controller 8 and system memory 10 may also communicate with each other using bus 22. Buses 20, 22 may be any of a variety of bus structures, such as a third generation bus (e.g., a HyperTransport bus or an InfiniBand bus), a second generation bus (e.g., an Advanced Graphics Port bus, a Peripheral Component Interconnect (PCI) Express bus, or an Advanced eXentisible Interface (AXI) bus) or another type of bus or device interconnect. It should be noted that the specific configuration of buses and communication interfaces between the different components shown in FIG. 1 is merely exemplary, and other configurations of computing devices and/or other graphics processing systems with the same or different components may be used to implement the techniques of this disclosure.

CPU 6 may comprise a general-purpose or a special-purpose processor that controls operation of computing device 2. A user may provide input to computing device 2 to cause CPU 6 to execute one or more software applications. The software applications that execute on CPU 6 may include, for example, an operating system, a word processor application, an email application, a spread sheet application, a media player application, a video game application, a graphical user interface application or another program. Additionally, CPU 6 may execute GPU driver 7 for controlling the operation of GPU 12. The user may provide input to computing device 2 via one or more input devices (not shown) such as a keyboard, a mouse, a microphone, a touch pad or another input device that is coupled to computing device 2 via user input interface 4.

The software applications that execute on CPU 6 may include one or more graphics rendering instructions that instruct CPU 6 to cause the rendering of graphics data to display 18. In some examples, the software instructions may conform to a graphics application programming interface (API), such as, e.g., an Open Graphics Library (OpenGL®) API, an Open Graphics Library Embedded Systems (OpenGL ES) API, a Direct3D API, an X3D API, a RenderMan API, a WebGL API, or any other public or proprietary standard graphics API. In order to process the graphics rendering instructions, CPU 6 may issue one or more graphics rendering commands to GPU 12 (e.g., through GPU driver 7) to cause GPU 12 to perform some or all of the rendering of the graphics data. In some examples, the graphics data to be rendered may include a list of graphics primitives, e.g., points, lines, triangles, quadrilaterals, triangle strips, etc.

In other examples, the software instructions that execute on CPU 6 may cause GPU 12 to execute a general purpose shader for performing more general computations applicable to be executed by the highly parallel nature of GPU hardware. Such general-purpose applications may be a so-called general-purpose graphics processing unit (GPGPU) and may conform to a general-purpose API, such as OpenCL.

Memory controller 8 facilitates the transfer of data going into and out of system memory 10. For example, memory controller 8 may receive memory read and write commands, and service such commands with respect to system memory 10 in order to provide memory services for the components in computing device 2. Memory controller 8 is communicatively coupled to system memory 10 via memory bus 22. Although memory controller 8 is illustrated in FIG. 1 as being a processing module that is separate from both CPU 6 and system memory 10, in other examples, some or all of the functionality of memory controller 8 may be implemented on one or both of CPU 6 and system memory 10.

System memory 10 may store program modules and/or instructions that are accessible for execution by CPU 6 and/or data for use by the programs executing on CPU 6. For example, system memory 10 may store a window manager application that is used by CPU 6 to present a graphical user interface (GUI) on display 18. In addition, system memory 10 may store user applications and application surface data associated with the applications. System memory 10 may additionally store information for use by and/or generated by other components of computing device 2. For example, system memory 10 may act as a device memory for GPU 12 and may store data to be operated on by GPU 12 as well as data resulting from operations performed by GPU 12. For example, system memory 10 may store any combination of texture buffers, depth buffers, stencil buffers, vertex buffers, frame buffers, or the like. System memory 10 may include one or more volatile or non-volatile memories or storage devices, such as, for example, random access memory (RAM), static RAM (SRAM), dynamic RAM (DRAM), read-only memory (ROM), erasable programmable ROM (EPROM), electrically erasable programmable ROM (EEPROM), Flash memory, a magnetic data media or an optical storage media.

GPU 12 may be configured to perform graphics operations to render one or more graphics primitives to display 18. Thus, when one of the software applications executing on CPU 6 requires graphics processing, CPU 6 may provide graphics commands and graphics data to GPU 12 for rendering to display 18. The graphics data may include, e.g., drawing commands, state information, primitive information, texture information, etc. GPU 12 may, in some instances, be built with a highly-parallel structure that provides more efficient processing of complex graphic-related operations than CPU 6. For example, GPU 12 may include a plurality of processing elements that are configured to operate on multiple vertices or pixels in a parallel manner. The highly parallel nature of GPU 12 may, in some instances, allow GPU 12 to draw graphics images (e.g., GUIs and two-dimensional (2D) and/or three-dimensional (3D) graphics scenes) onto display 18 more quickly than drawing the scenes directly to display 18 using CPU 6.

As will be explained in more detail below, GPU 12 may a fixed hardware pipeline configured to execute one or more functions on a current set of graphics data. In the context of this disclosure, a set of graphics data is one or more values of data on which logical and/or mathematical functions may be performed. The fixed hardware pipeline may include plurality of stages, including a bypassable portion of the plurality of stages. GPU 12 may further include a shortcut circuit configured to route the current set of graphics data around the bypassable portion of the plurality of stages, and a controller positioned before the bypassable portion of the plurality of stages. The controller may be configured to selectively route the current set of graphics data to one of the shortcut circuit or the bypassable portion of the plurality of stages.

GPU 12 may, in some instances, be integrated into a motherboard of computing device 2. In other instances, GPU 12 may be present on a graphics card that is installed in a port in the motherboard of computing device 2 or may be otherwise incorporated within a peripheral device configured to interoperate with computing device 2. GPU 12 may include one or more processors, such as one or more microprocessors, application specific integrated circuits (ASICs), field programmable gate arrays (FPGAs), digital signal processors (DSPs), or other equivalent integrated or discrete logic circuitry.

GPU 12 may be directly coupled to graphics memory 14. Thus, GPU 12 may read data from and write data to graphics memory 14 without using bus 20. In other words, GPU 12 may process data locally using a local storage, instead of off-chip memory. This allows GPU 12 to operate in a more efficient manner by eliminating the need of GPU 12 to read and write data via bus 20, which may experience heavy bus traffic. In some instances, however, GPU 12 may not include a separate memory, but instead utilize system memory 10 via bus 20. Graphics memory 14 may include one or more volatile or non-volatile memories or storage devices, such as, e.g., RAM, SRAM, DRAM, EPROM, EEPROM, Flash memory, a magnetic data media or an optical storage media.

CPU 6 and/or GPU 12 may store rendered image data in a frame buffer 15. Frame buffer 15 may be an independent memory or may be allocated within system memory 10. Display interface 16 may retrieve the data from frame buffer 15 and configure display 18 to display the image represented by the rendered image data. In some examples, display interface 16 may include a digital-to-analog converter (DAC) that is configured to convert the digital values retrieved from the frame buffer into an analog signal consumable by display 18. In other examples, display interface 16 may pass the digital values directly to display 18 for processing. Display 18 may include a monitor, a television, a projection device, a liquid crystal display (LCD), a plasma display panel, a light emitting diode (LED) array, such as an organic LED (OLED) display, a cathode ray tube (CRT) display, electronic paper, a surface-conduction electron-emitted display (SED), a laser television display, a nanocrystal display or another type of display unit. Display 18 may be integrated within computing device 2. For instance, display 18 may be a screen of a mobile telephone. Alternatively, display 18 may be a stand-alone device coupled to computing device 2 via a wired or wireless communications link. For instance, display 18 may be a computer monitor or flat panel display connected to a personal computer via a cable or wireless link.

Figure 2:
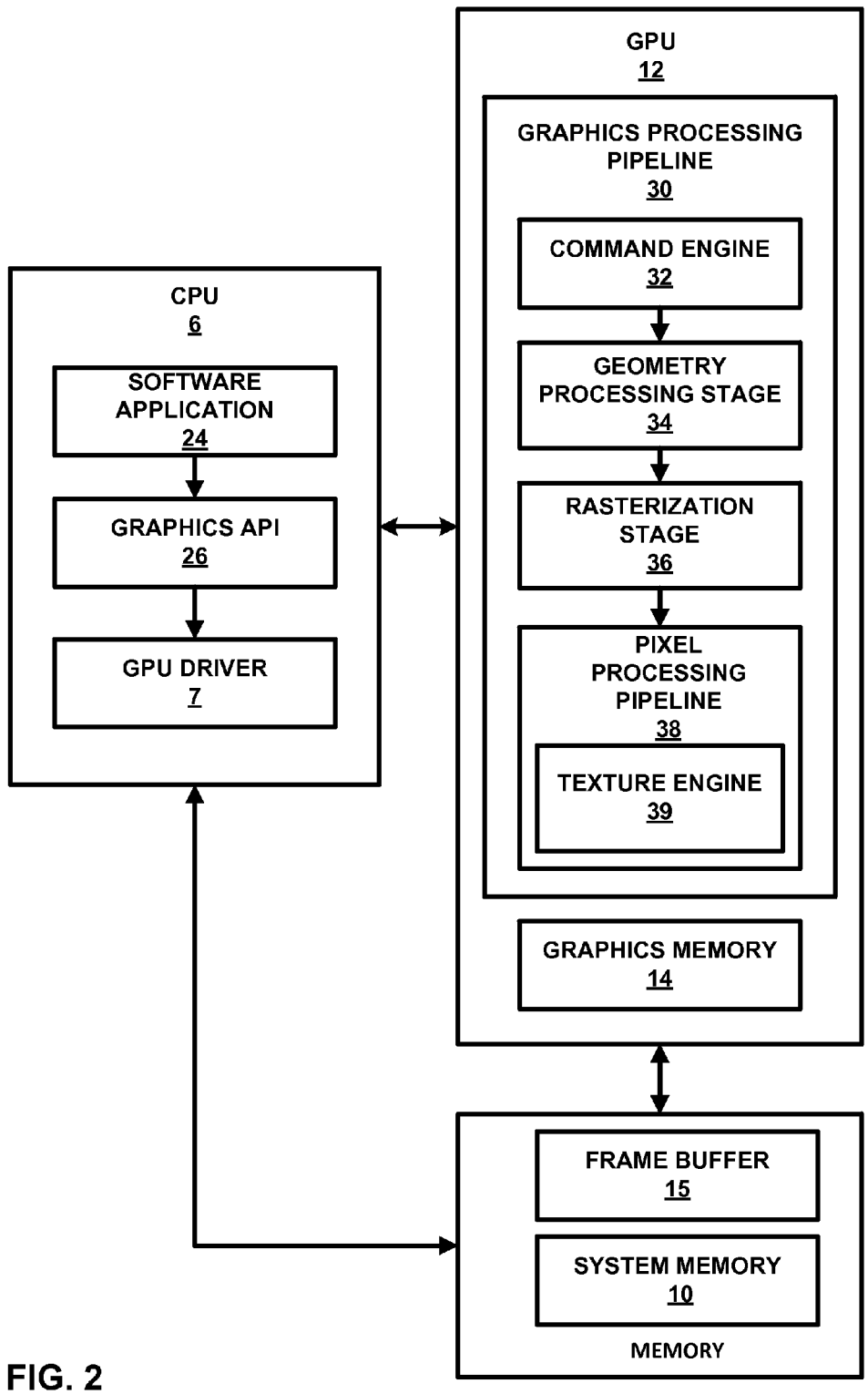
FIG. 2 is a block diagram showing components of FIG. 1 in more detail.

FIG. 2 is a block diagram illustrating example implementations of CPU 6, GPU 12, and system memory 10 of FIG. 1 in further detail. CPU 6 may include at least one software application 24, graphics API 26, and GPU driver 7, each of which may be one or more software applications or services that execute on CPU 6. GPU 12 may include graphics processing pipeline 30 that includes a plurality of graphics processing stages that operate together to execute graphics processing commands. GPU 12 may be configured to execute graphics processing pipeline 30 in a variety of rendering modes, including a binning rendering mode and a direct rendering mode. As shown in FIG. 2, graphics processing pipeline 30 may include command engine 32, geometry processing stage 34, rasterization stage 36, and pixel processing pipeline 38. Pixel processing pipeline 38 may include texture engine 39. Each of the components in graphics processing pipeline 30 may be implemented as fixed-function components, programmable components (e.g., as part of a shader program executing on a programmable shader unit), or as a combination of fixed-function and programmable components. Memory available to CPU 6 and GPU 12 may include system memory 10 and frame buffer 15. Frame buffer 15 may be a part of system memory 10 or may be separate from system memory 10. Frame buffer 15 may store rendered image data.

Software application 24 may be any application that utilizes the functionality of GPU 12. For example, software application 24 may be a GUI application, an operating system, a portable mapping application, a computer-aided design program for engineering or artistic applications, a video game application, or another type of software application that may utilize a GPU.

Software application 24 may include one or more drawing instructions that instruct GPU 12 to render a graphical user interface (GUI) and/or a graphics scene. For example, the drawing instructions may include instructions that define a set of one or more graphics primitives to be rendered by GPU 12. In some examples, the drawing instructions may, collectively, define all or part of a plurality of windowing surfaces used in a GUI. In additional examples, the drawing instructions may, collectively, define all or part of a graphics scene that includes one or more graphics objects within a model space or world space defined by the application.

Software application 24 may invoke GPU driver 7, via graphics API 26, to issue one or more commands to GPU 12 for rendering one or more graphics primitives into displayable graphics images. For example, software application 24 may invoke GPU driver 7, via graphics API 26, to provide primitive definitions to GPU 12. In some instances, the primitive definitions may be provided to GPU 12 in the form of a list of drawing primitives, e.g., triangles, rectangles, triangle fans, triangle strips, etc. The primitive definitions may include vertex specifications that specify one or more vertices associated with the primitives to be rendered. The vertex specifications may include positional coordinates for each vertex and, in some instances, other attributes associated with the vertex, such as, e.g., color coordinates, normal vectors, and texture coordinates.

The primitive definitions may also include primitive type information (e.g., triangle, rectangle, triangle fan, triangle strip, etc.), scaling information, rotation information, and the like. Based on the instructions issued by software application 24 to GPU driver 7, GPU driver 7 may formulate one or more commands that specify one or more operations for GPU 12 to perform in order to render the primitive. When GPU 12 receives a command from CPU 6, graphics processing pipeline 30 decodes the command and configures one or more processing elements within graphics processing pipeline 30 to perform the operation specified in the command. After performing the specified operations, graphics processing pipeline 30 outputs the rendered data to frame buffer 15 associated with a display device. Graphics processing pipeline 30 may be configured to execute in one of a plurality of different rendering modes, including a binning rendering mode and a direct rendering mode.

GPU driver 7 may be further configured to compile one or more shader programs, and to download the compiled shader programs onto one or more programmable shader units contained within GPU 12. The shader programs may be written in a high level shading language, such as, e.g., an OpenGL Shading Language (GLSL), a High Level Shading Language (HLSL), a C for Graphics (Cg) shading language, etc. The compiled shader programs may include one or more instructions that control the operation of a programmable shader unit within GPU 12. For example, the shader programs may include vertex shader programs and/or pixel shader programs. A vertex shader program may control the execution of a programmable vertex shader unit or a unified shader unit, and include instructions that specify one or more per-vertex operations. A pixel shader program may include pixel shader programs that control the execution of a programmable pixel shader unit or a unified shader unit, and include instructions that specify one or more per-pixel operations.

Graphics processing pipeline 30 may be configured to receive one or more graphics processing commands from CPU 6, via GPU driver 7, and to execute the graphics processing commands to generate displayable graphics images. As discussed above, graphics processing pipeline 30 includes a plurality of stages that operate together to execute graphics processing commands. It should be noted, however, that such stages need not necessarily be implemented in separate hardware blocks. For example, portions of geometry processing stage 34 and pixel processing pipeline 38 may be implemented as part of a unified shader unit. Again, graphics processing pipeline 30 may be configured to execute in one of a plurality of different rendering modes, including a binning rendering mode and a direct rendering mode.

Command engine 32 may receive graphics processing commands and configure the remaining processing stages within graphics processing pipeline 30 to perform various operations for carrying out the graphics processing commands. The graphics processing commands may include, for example, drawing commands and graphics state commands. The drawing commands may include vertex specification commands that specify positional coordinates for one or more vertices and, in some instances, other attribute values associated with each of the vertices, such as, e.g., color coordinates, normal vectors, texture coordinates and fog coordinates. The graphics state commands may include primitive type commands, transformation commands, lighting commands, etc. The primitive type commands may specify the type of primitive to be rendered and/or how the vertices are combined to form a primitive. The transformation commands may specify the types of transformations to perform on the vertices. The lighting commands may specify the type, direction and/or placement of different lights within a graphics scene. Command engine 32 may cause geometry processing stage 34 to perform geometry processing with respect to vertices and/or primitives associated with one or more received commands.

Geometry processing stage 34 may perform per-vertex operations and/or primitive setup operations on one or more vertices in order to generate primitive data for rasterization stage 36. Each vertex may be associated with a set of attributes, such as, e.g., positional coordinates, color values, a normal vector, and texture coordinates. Geometry processing stage 34 modifies one or more of these attributes according to various per-vertex operations. For example, geometry processing stage 34 may perform one or more transformations on vertex positional coordinates to produce modified vertex positional coordinates. Geometry processing stage 34 may, for example, apply one or more of a modeling transformation, a viewing transformation, a projection transformation, a ModelView transformation, a ModelViewProjection transformation, a viewport transformation and a depth range scaling transformation to the vertex positional coordinates to generate the modified vertex positional coordinates. In some instances, the vertex positional coordinates may be model space coordinates, and the modified vertex positional coordinates may be screen space coordinates. The screen space coordinates may be obtained after the application of the modeling, viewing, projection and viewport transformations. In some instances, geometry processing stage 34 may also perform per-vertex lighting operations on the vertices to generate modified color coordinates for the vertices. Geometry processing stage 34 may also perform other operations including, e.g., normal transformations, normal normalization operations, view volume clipping, homogenous division and/or backface culling operations.

Geometry processing stage 34 may produce primitive data that includes a set of one or more modified vertices that define a primitive to be rasterized as well as data that specifies how the vertices combine to form a primitive. Each of the modified vertices may include, for example, modified vertex positional coordinates and processed vertex attribute values associated with the vertex. The primitive data may collectively correspond to a primitive to be rasterized by further stages of graphics processing pipeline 30. Conceptually, each vertex may correspond to a corner of a primitive where two edges of the primitive meet. Geometry processing stage 34 may provide the primitive data to rasterization stage 36 for further processing.

In some examples, all or part of geometry processing stage 34 may be implemented by one or more shader programs executing on one or more shader units. For example, geometry processing stage 34 may be implemented, in such examples, by a vertex shader, a geometry shader or any combination thereof. In other examples, geometry processing stage 34 may be implemented as a fixed-function hardware processing pipeline or as a combination of fixed-function hardware and one or more shader programs executing on one or more shader units.

Rasterization stage 36 is configured to receive, from geometry processing stage 34, primitive data that represents a primitive to be rasterized, and to rasterize the primitive to generate a plurality of source pixels that correspond to the rasterized primitive. In some examples, rasterization stage 36 may determine which screen pixel locations are covered by the primitive to be rasterized, and generate a source pixel for each screen pixel location determined to be covered by the primitive. Rasterization stage 36 may determine which screen pixel locations are covered by a primitive by using techniques known to those of skill in the art, such as, e.g., an edge-walking technique, evaluating edge equations, etc. Rasterization stage 36 may provide the resulting source pixels to pixel processing pipeline 38 for further processing.

The source pixels generated by rasterization stage 36 may correspond to a screen pixel location, e.g., a destination pixel, and be associated with one or more color attributes. All of the source pixels generated for a specific rasterized primitive may be said to be associated with the rasterized primitive. The pixels that are determined by rasterization stage 36 to be covered by a primitive may conceptually include pixels that represent the vertices of the primitive, pixels that represent the edges of the primitive and pixels that represent the interior of the primitive.

Pixel processing pipeline 38 is configured to receive a source pixel associated with a rasterized primitive, and to perform one or more per-pixel operations on the source pixel. Per-pixel operations that may be performed by pixel processing pipeline 38 include, e.g., alpha test, texture mapping, color computation, pixel shading, per-pixel lighting, fog processing, blending, a pixel ownership test, a source alpha test, a stencil test, a depth test, a scissors test and/or stippling operations. In addition, pixel processing pipeline 38 may execute one or more pixel shader programs to perform one or more per-pixel operations. The resulting data produced by pixel processing pipeline 38 may be referred to herein as destination pixel data and stored in frame buffer 15. The destination pixel data may be associated with a destination pixel in frame buffer 15 that has the same display location as the source pixel that was processed. The destination pixel data may include data such as, e.g., color values, destination alpha values, depth values, etc.

Texture engine 39 may included as part of pixel processing pipeline 38. Texture engine 39 may include both programmable and fixed function hardware designed to apply textures (texels) to pixels. Texture engine 39 may include dedicated hardware for performing texture filtering, whereby one or more texel values are multiplied by one or more pixel values and accumulated to produce the final texture mapped pixel. As will be explained in more detail below, this disclosure proposes modifications to texture engine 39 so that texture engine 39 may be used to perform LCHOF using a single shader instruction.

Frame buffer 15 stores destination pixels for GPU 12. Each destination pixel may be associated with a unique screen pixel location. In some examples, frame buffer 15 may store color components and a destination alpha value for each destination pixel. For example, frame buffer 15 may store Red, Green, Blue, Alpha (RGBA) components for each pixel where the "RGB" components correspond to color values and the "A" component corresponds to a destination alpha value. Although frame buffer 15 and system memory 10 are illustrated as being separate memory units, in other examples, frame buffer 15 may be part of system memory 10.

As explained above, graphics processing pipeline 30 of GPU 12 may include one or more fixed hardware pipelines configured to execute one or more processes on graphics data. Examples processes of graphics processing pipeline 30 that may utilize a fixed hardware pipeline include texture mapping (e.g., performed in texture engine 39), tessellation (e.g., performed in geometry processing stage 34 or a separate tessellation unit), triangle rasterization (e.g., performed in rasterization stage 36), pixel blending (e.g., performed in texture engine 39). Texture mapping, tessellation, triangle rasterization, and pixel blending are just examples of graphics processes that may be executed using a fixed hardware pipeline. The techniques of this disclosure may be utilized generally with fixed hardware pipeline, regardless of the actual process being performed.

Figure 3:
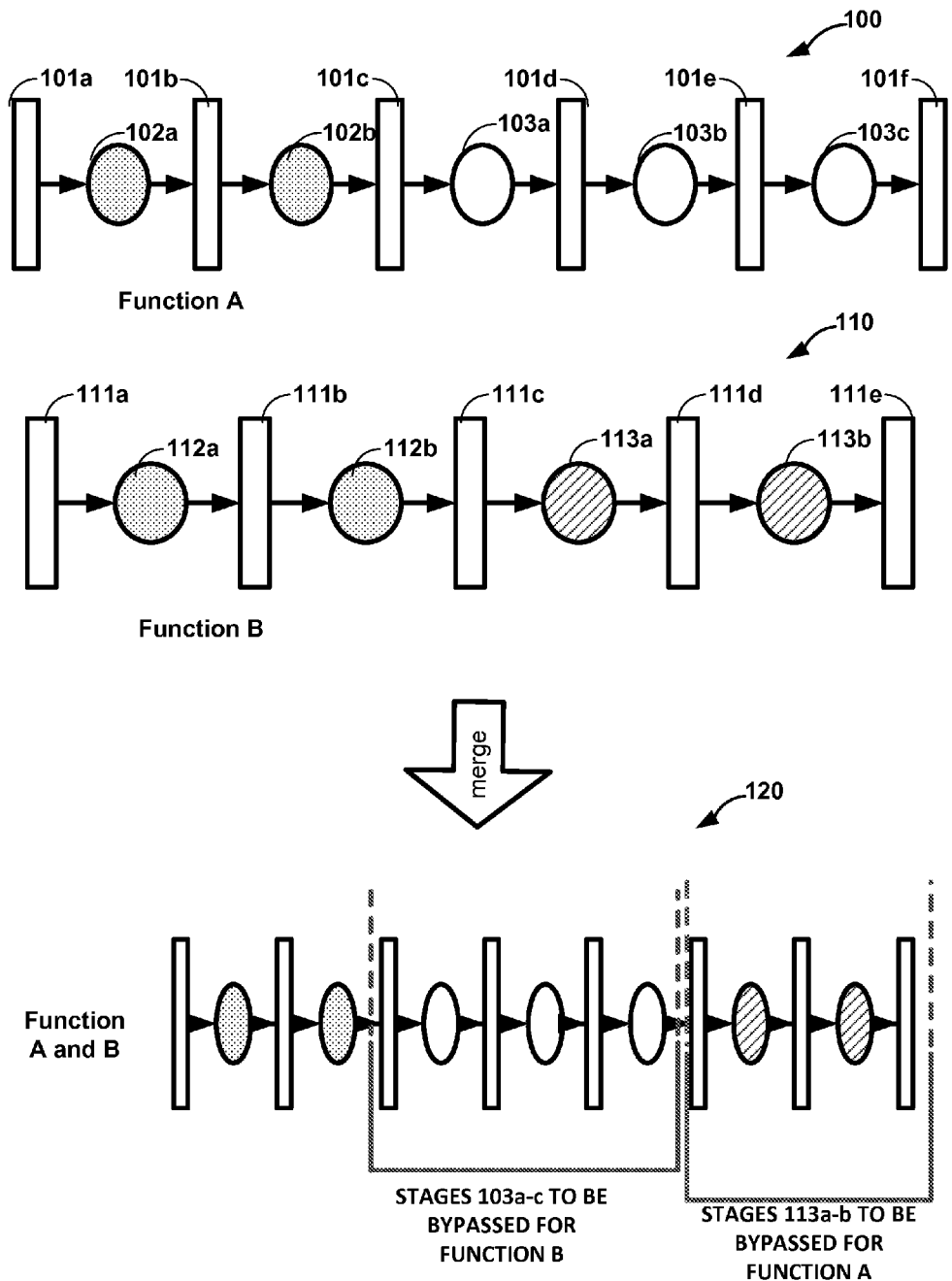
FIG. 3 is a block diagram showing example fixed hardware pipelines.

FIG. 3 is a conceptual diagram showing example fixed hardware pipelines. Fixed hardware pipeline 100 is configured to execute a function (Function A) on a set of graphics data. Again, in the context of this disclosure, a set of graphics data is one or more values of data on which logical and/or mathematical functions may be performed. For example, fixed hardware pipeline 100 (or any other fixed hardware pipeline described in this disclosure) may be configured to perform functions on one or more values of graphics data in parallel. Fixed hardware pipeline 100 may include a plurality of stages that include hardware logic units for performing a function on the graphics data (i.e., performing one or more logical functions), and one or more registers configured to store the results of the functions performed on the graphics data. As shown in FIG. 3, fixed hardware pipeline 100 includes a first stage of hardware logic units 102*a* and 102*b*, and a second stage of hardware logic units 103*a*, 103*b*, and 103*c*. Fixed hardware pipeline 100 also includes registers 101*a-f* configured to store the intermediate results of hardware logic units 102*a-b*, and 103*a-c* performing logical functions on the graphics data.

Fixed hardware pipeline 110 is configured to execute a different function (i.e., a Function B different from Function A) on a set of graphics data. As shown in FIG. 3, fixed hardware pipeline 110 includes a first stage of hardware logic units 112*a* and 112*b*, and a second stage of hardware logic units 113*a* and 113*b*. Fixed hardware pipeline 110 also includes registers 111*a-e* configured to store the intermediate results of hardware logic units 112*a-b*, and 113*a-b* performing logical functions on the graphics data.

As depicted in FIG. 3, hardware logic units 102*a-b* of fixed hardware pipeline 100 perform the same functions as hardware logic units 112*a-b* of fixed pipeline 110. Having two separate fixed hardware pipelines 100 and 110 to perform Functions A and B, respectively, may be undesirable and/or expensive in terms of chip area, as fixed function pipelines often require a considerable amount of space to implement on a GPU. In general, there may be N number of different functions, and having N separate fixed pipelines may vastly increase power consumption and chip area.

Accordingly, in some examples, a GPU (e.g., GPU 12) may be designed to include a single fixed hardware pipeline 120, as illustrated, that includes the hardware logic units necessary to perform both Function A and Function B. In a sense, the fixed hardware pipelines for Function A and Function B have been merged. However, to perform Function A using fixed hardware pipeline 120, a portion of the stages of hardware pipeline 120 that correspond to hardware logic units 113*a-b* may not be needed and may instead be bypassed in some manner. Likewise, to perform Function B using fixed hardware pipeline 120, a portion of the stages including hardware logic units 103*a-c* may not be needed and may instead be bypassed in some manner.

Conventional techniques for bypassing one or more stages of a fixed hardware pipeline in order to perform a particular function (i.e., a particular function that does not require particular stages of the fixed hardware pipeline) exhibit drawbacks in terms of large chip areas needed for implementation, high data latency through the fixed hardware pipeline (i.e., the time it takes data to move through the pipeline), and large and/or undesirable amounts of power consumption.

For example, to perform Function A using fixed pipeline 120, a set of graphics data still pass through the registers associated with hardware logic units 113*a-b*, if not bypassed, even through hardware logic units 113*a-b* are disabled and do not perform any function on the set of graphics (i.e., the set of graphics data is passed through hardware logic units 113*a-b*). Likewise, to perform Function B using fixed pipeline 120, a set of graphics data still pass through the registers associated with stages 103*a-c*, if not bypassed, even through hardware logic units 103*a-c* are disabled and do not perform any function on the set of graphics. That is, to perform Function A or Function B using fixed hardware pipeline 120 requires extra clock cycles to move the data through unneeded portions of the fixed hardware pipeline. As such, fixed hardware pipeline 120, while limiting the amount of hardware needed for single-purpose pipelines (e.g., fixed hardware pipelines 100 and 110,) introduces increased latency for functions that do not use all of the stages of the pipeline (i.e., an increased time to move through the pipeline) relative to the single-purpose pipelines.

Figure 4:
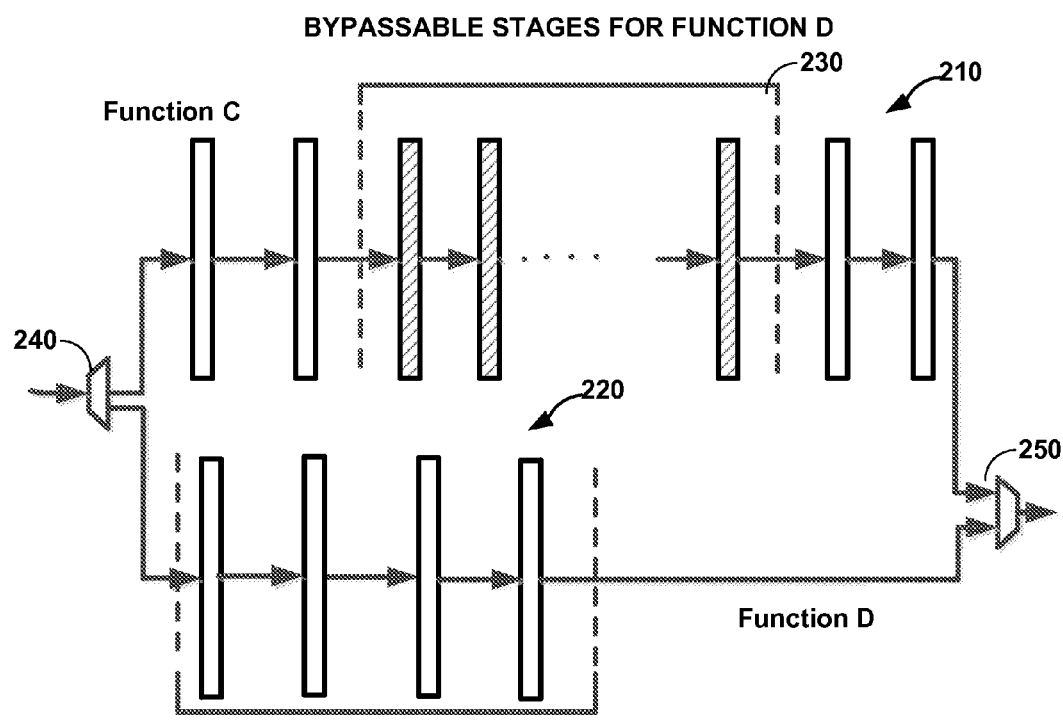
FIG. 4 is a block diagram showing another example of a fixed hardware pipeline.

FIG. 4 shows an example of a fixed hardware pipeline configured to limit the latency problems associated with the merged fixed hardware pipeline 120 of FIG. 3. In the example of FIG. 4, hardware logic units 210 are configured to perform Function C on a set of graphics data. Likewise, hardware logic units 220 are configured to perform Function D on the set of graphics. The hardware logic units needed to perform Function C and Function D are identical, except for hardware logic units 230 (i.e., units 210 and 220 are identical, except unit 210 includes units 230 that unit 220 does not). In a sense, hardware logic units 230 are bypassable for Function D.

For ease of depiction, each of the rectangular blocks of hardware logic units 210 and 220 represent both a hardware logic unit and a corresponding register used to store the results of a particular hardware logic unit operating on the set of graphics data. This convention will be used for each subsequent figure in the application.

Rather than merging the pipelines for Function C and Function D and introducing the resultant increased latency for processing Function C, as in the example of FIG. 3, the example of FIG. 4 maintains two separate pipelines to perform Function C and Function D, respectively. That is, a set of graphics data is received at multiplexer 240, and multiplexer 240 may be configured to route the set of graphics data to one of the Function C or Function D pipeline depending on the operation desired to be performed on the graphics data (e.g., as controlled by a software instruction). Once passing through either the Function C or the Function D portion of the fixed hardware pipeline, the set of graphics data passes through demultiplexer 250 and is forwarded to another portion of the fixed hardware pipeline (e.g., to either another bypassable portion or to a portion that is not bypassable).

Accordingly, the example of FIG. 4 does not have any of the latency drawbacks of fixed hardware pipeline 120 in the example of FIG. 3. However, the fixed hardware pipeline of the example of FIG. 4 requires additional area on a chip (e.g., GPU 12) to implement the extra hardware logic units needed for Function D. In addition, having two separate fixed hardware pipelines for Function C and Function D may increase the power consumption of the pipeline.

Figure 5:
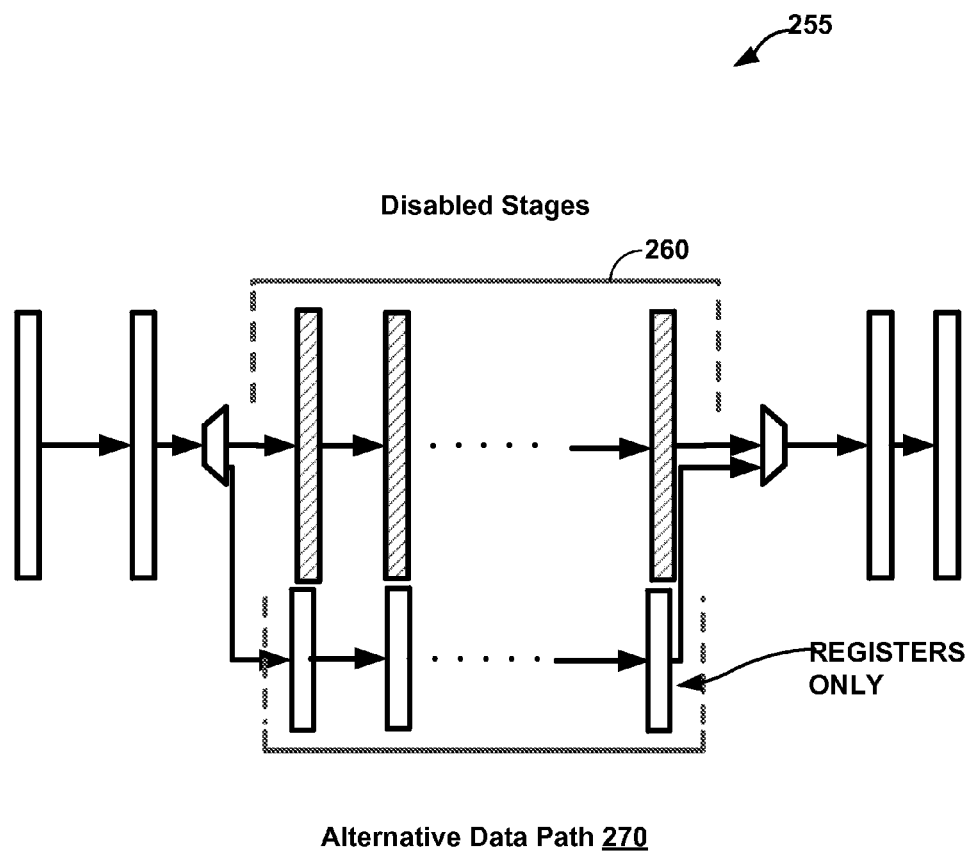
FIG. 5 is a block diagram showing another example of a fixed hardware pipeline.

FIG. 5 shows another example of a fixed hardware pipeline that is configured to limit the power consumption drawbacks of the fixed hardware pipelines of FIG. 3 and FIG. 4. In the example of FIG. 5, fixed hardware pipeline 255 may include bypassable stages 260 that may be completely powered down when not in use (i.e., when bypassed), thus lowering power consumption. In the case that the functions performed by bypassable stages 260 are not to be performed on a set of graphics data, that set of graphics data is routed through an alternative data path 270. Alternative data path 270 includes a number of registers equal to the number of stages in bypassable stages 260. In this way, the set of graphics data may be clocked through alternative data path 270 in the same amount of time as if the set of graphics data were clocked through bypassable stages 260. Though the example of FIG. 5 still exhibits latency issues, the in-order execution is maintained. That is, the set of graphics data that bypasses bypassable stages 260 do not reach subsequent stages of fixed hardware pipeline 255 before previous data that does utilize bypassable stages 260.

As shown in the foregoing discussion, various techniques for performing fixed hardware pipelines in a GPU exhibit drawbacks in terms of data latency, chip area cost, and power consumption. In view of these drawbacks, this disclosure describes apparatuses and techniques for executing a dynamic fixed hardware pipeline for performing one or more functions on graphics data. In various example of the disclosure, the dynamic fixed hardware pipeline may be configured to selectively skip unused pipeline stages (i.e., bypassable stages). In particular, example techniques of this disclosure use a bypass controller to selectively route a set of graphics data through one or more bypassable stages of a fixed hardware pipeline, or to route the set of graphics data through a shortcut circuit around the bypassable stages.

In various examples of the disclosure, the bypass controller may be configured to route a current set of graphics data based on one or more different criteria. The criteria may include a current instruction for the current set of graphics data, instructions for a subsequent set of graphics data, and an indication of whether or not the bypassable stages are currently processing other graphics data. In this way, as will be explained in more detail below, the example apparatuses and techniques of this disclosure may selectively route graphics data through or around bypassable stages while maintaining in-order execution, and providing for improved data latency, power consumption, and chip area cost.

Figure 6:
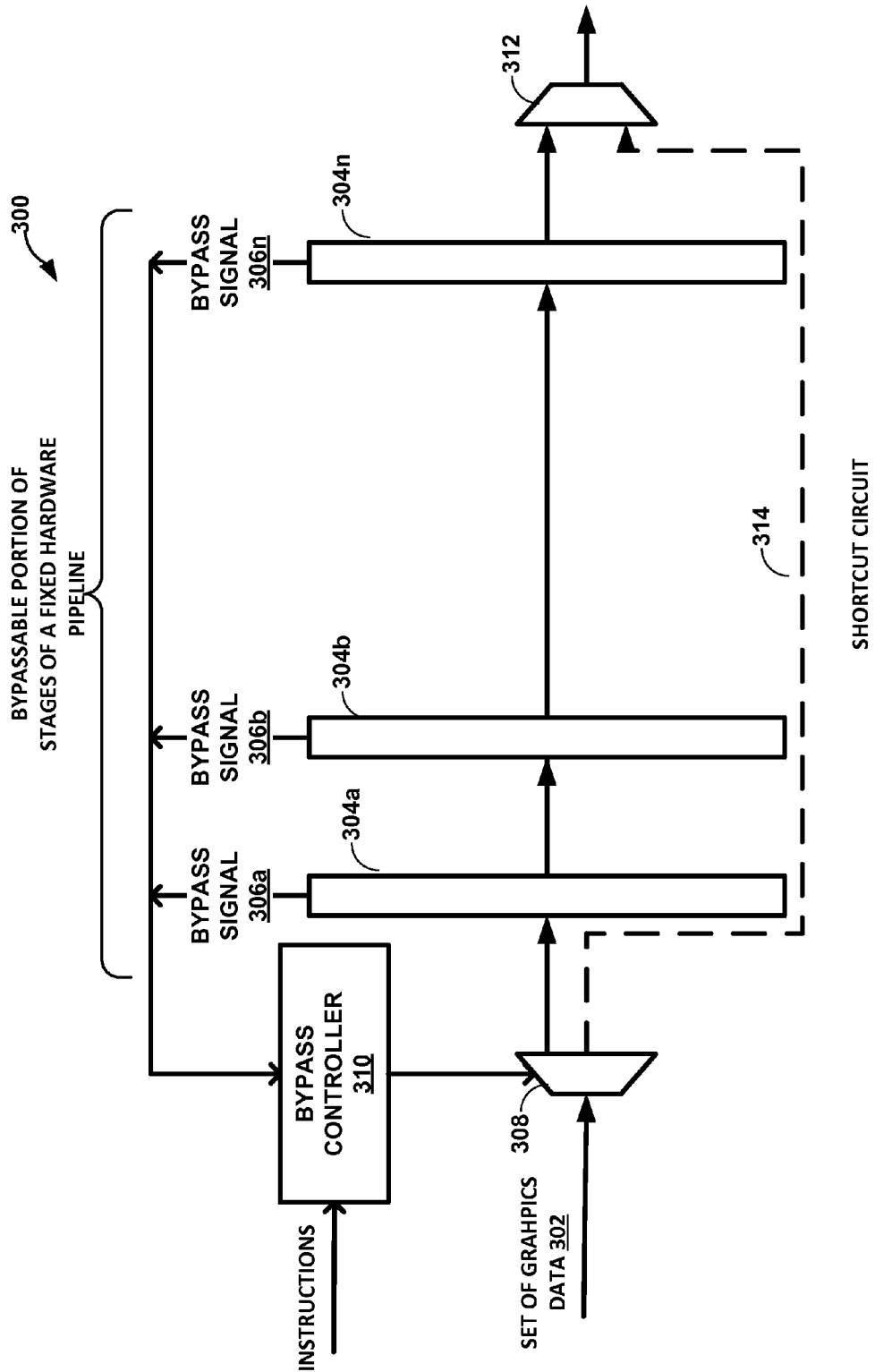
FIG. 6 is a block diagram showing an example of a fixed hardware pipeline according to the techniques of the disclosure.

FIG. 6 is a block diagram showing an example of a fixed hardware pipeline according to the techniques of the disclosure. FIG. 6 depicts a bypassable portion of stages 300 of a larger fixed hardware pipeline that may be implemented in GPU 12. That is, a set of graphics data 302 enters bypassable portion of stage 300 from a previous portion of the larger fixed hardware pipeline, and the set of graphics data 302 exits the bypassable portion of stages 300 to continue to a subsequent portion of the larger fixed hardware pipeline. Bypassable portion of stages 300 include hardware logic units 304a-n that are configured to perform a particular function on the set of graphics data 302. Each of hardware logic units 304a-n, as depicted in FIG. 6, include both one or more hardware logic units configured to perform a logical and/or mathematical function on the set of graphics data 302, as well as a register to store the intermediate results of the logical and/or mathematical function applied to the set of graphics data 302.

Figure 9:
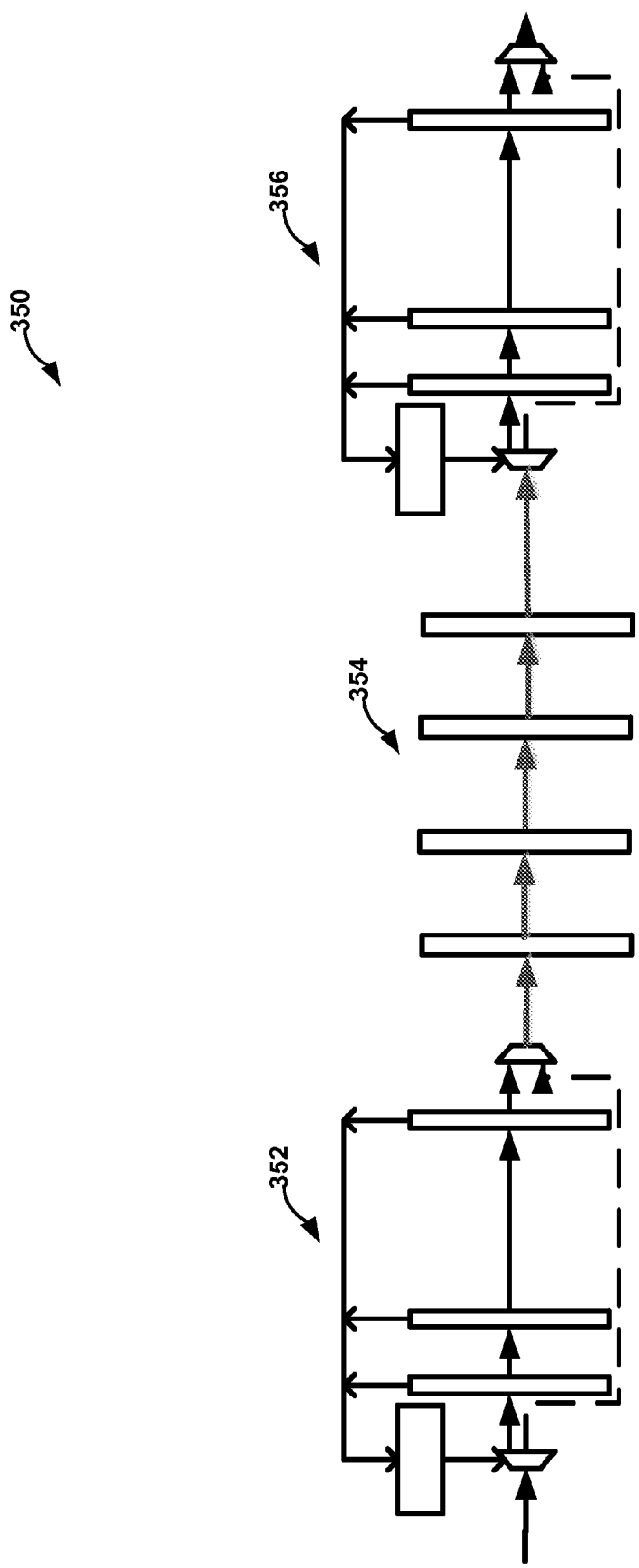
FIG. 9 is a block diagram showing another example of a fixed hardware pipeline according to the techniques of the disclosure.

It should be understood, that bypassable portion of stages 300 represents one possible portion of bypassable stages in a larger fixed hardware pipeline. A fixed hardware pipeline may include multiple bypassable portions, each with their own bypass controller. FIG. 9 is a block diagram showing another example of a fixed hardware pipeline according to the techniques of the disclosure. As can be seen in FIG. 9, fixed hardware pipeline may include a first bypassable portion of stages 352, a fixed portion of stages 354 (i.e., stages that are not bypassable), and a second portion of bypassable stages 356. By merging bypassable portions of stages into one fixed hardware pipeline, chip area may be saved compared to implementations that use separate fixed hardware pipelines with no bypassable stages.

The function performed by bypassable portion of stages 300 may not be necessary to be performed for every set of graphics data. As such, bypassable portion of stages 300 may be bypassed for particular sets of graphics data. In accordance with the techniques of this disclosure, set of graphics data 302 may be either routed through bypassable portion of stages 300, or around bypassable portion of stages 300 by routing the set of graphics data 302 through shortcut circuit 314. Multiplexer 308 may be configured to selectively route the set of graphics data 302 to one of bypassable portion of stages 300 or shortcut circuit 314. In particular, bypass controller 310 that is positioned before bypassable portion of stages 300 is configured to control the operation of multiplexer 308 to route the set of graphics data 302. Regardless of where the set of graphics data 302 is routed, the set of graphics data 302 eventually arrives at demultiplexer 312 which forwards the set of graphics data 302 to another portion of the larger fixed hardware pipeline or possibly as an output of the pipeline.

Bypass controller 310 may be configured to use one or more criteria to determine where to route the set of graphics data 302. One example criteria is the instructions corresponding to the set of graphics data 302. That is, if the instructions related to processing the set of graphics data 302 require the function performed by bypassable portion of stages 300, bypass controller 310 will control multiplexer 308 to route the set of graphics data 302 through bypassable portion of stages 300. If the instructions related to processing the set of graphics data 302 do not require the function performed by bypassable portion of stages 300, bypass controller 310 will control multiplexer 308 to route the set of graphics data 302 through shortcut circuit 314. Since shortcut circuit 314 is a direct connection around bypassable portion of stages 300, and does not need to be clocked through an identical number of stages, data latency experienced when bypassing bypassable portion of stages 300 is greatly reduced. That is, fewer clock cycles are needed to move the set of graphics data around any bypassed stages.

Furthermore, bypass controller 310 (or another hardware unit of GPU 12) may be further configured to power down bypassable portion of stages 300 when it is determined to route the set of graphics data 302 through shortcut circuit 314. In this way, power consumption may be reduced.

In another example of the disclosure, bypass controller 310 may be configured to utilize additional criteria to determine the routing for the set of graphics data 302. That is, rather than routing the set of graphics data 302 based solely on instructions related to the set of graphics data 302, bypass controller 310 may also consider whether or not bypassable portion of stages 300 is currently processing a previous set of graphics data. In this regard, hardware logic units 304a-n may be configured to transmit bypass signals 306a-n to bypass controller 310 that indicate whether or not hardware logic units 304a-n are current processing graphics data. In one example of the disclosure, bypass signals 306a-n may be generated by registers associated with hardware logic units 306a-n. In effect, the registers may include additional hardware that generates bypass signals 306a-n that indicate whether or not data for a previous set of graphics data is currently being stored in the registers, and is thus still being processed by bypassable portion of stages 300.

As discussed above, bypass controller 310 may utilize bypass signals 306a-n to determine the status of bypassable portion of stages 300. In another example, bypass controller 310 may be configured to analyze instructions related to a previous set of graphics data and determine if those instructions required the previous set of graphics data to be processed by bypassable portion of stages 300. If yes, bypass controller may determine if the previous set of graphics is still being processed by bypassable portion of stages 300 based on the current time and the time the previous set of graphics data entered bypassable portion of stages 300. That is, bypass controller 310 may store information indicating the amount of time bypassable portion of stages 300 needs to process a set of graphics data and determine if a particular set of graphics data is still being processed based on the amount of time that has passed since processing began.

It may be beneficial, in some circumstances, to route the set of graphics data 302 to shortcut circuit 314 only in the case that no other data is currently being processed by bypassable portion of stages 300. This is to avoid the situation where the set of graphics data 302 arrives at demultiplexer 312 via shortcut circuit 314 before a previous set of graphics data has finished being processed by bypassable portion of stages 300. Such a situation would result in data being out of order, which may be unacceptable when in-order execution is required. In-order execution is a requirement for data (or sets of data) to exit the fixed hardware pipeline in the same order the data (or sets of data) entered the fixed hardware pipeline.

Accordingly, in another example of the disclosure, bypass controller 310 may be configured to route the set of graphics data 302 to bypassable portion of stages 300 or shortcut circuit 314 based both on instructions related to the current set of graphics data 302 and the status of bypassable portion of stages 300 (i.e., whether or not bypassable portion of stages 300 is currently processing a previous set of graphics data). It should be understood that bypass controller 310 may be configured to determine the status of bypassable portion of stages 300 in any manner, such as through bypass signals 306a-n, and the instruction analysis techniques discussed above.

In this example, if the instructions related to processing the set of graphics data 302 require the function performed by bypassable portion of stages 300, bypass controller 310 will control multiplexer 308 to route the set of graphics data 302 through bypassable portion of stages 300. If the instructions related to processing the set of graphics data 302 do not require the function performed by bypassable portion of stages 300, bypass controller 310 will control multiplexer 308 to route the set of graphics data 302 through shortcut circuit 314 only in the case that bypassable portion of stages 300 are not currently processing a previous set of graphics data (e.g., as indicated by bypass signals 306a-n). That is, in order to maintain in-order execution, bypass controller 310 may be configured to route the set of graphics data 302 through bypassable portion of stages 300 if bypassable portion of stages 300 is currently processing a previous set of graphics data. If the current set of graphics data do not require the functions performed by bypassable portion of stages 300, bypassable portion of stages 300 will be instructed to pass the set of graphics data 302 through unchanged. Bypass controller 310 is configured to route the set of graphics data 302 through shortcut circuit 314 in the case that instructions related to the set of graphics data 302 do not require processing by bypassable portion of stages 300, and bypass controller 310 has determined that bypassable portion of stages 300 is not currently processing a previous set of graphics data.

In a further example of the disclosure, bypass controller 310 may be further configured to analyze instructions related to subsequent set(s) of graphics data to determine the routing of the set of graphics data 302. For example, bypass controller 310 may be configured to analyze instructions related to subsequent set(s) of graphics data to determine whether or not the subsequent sets of graphics data will be processed by bypassable portion of stages 300. The subsequent sets of graphics data are subsequent to a current set of graphics data, e.g., set of graphics data 302. Such an analysis may be used to determining a routing for a current set of graphics data (e.g., set of graphics data 302) in order to avoid so-called data "bubbles."

A data bubble results when one set of data is processed more quickly than a previous set of data, thus resulting in a time period (i.e., the bubble) where no data processing is being performed in a certain portion of the pipeline. Such data bubbles result in data discontinuities, unused pipeline stages, and general graphics pipeline inefficiency. In the example of FIG. 6, a data bubble may occur if the set of graphics data 302 is routed through shortcut circuit 314, but a subsequent set of graphics data is routed through bypassable portion of stages 300. Since data traverses through bypassable portion of stages 300 at a much slower rate than through shortcut circuit 314, a data bubble may form between the set of graphics data 302 and a subsequent set of graphics data.

Figure 7A:
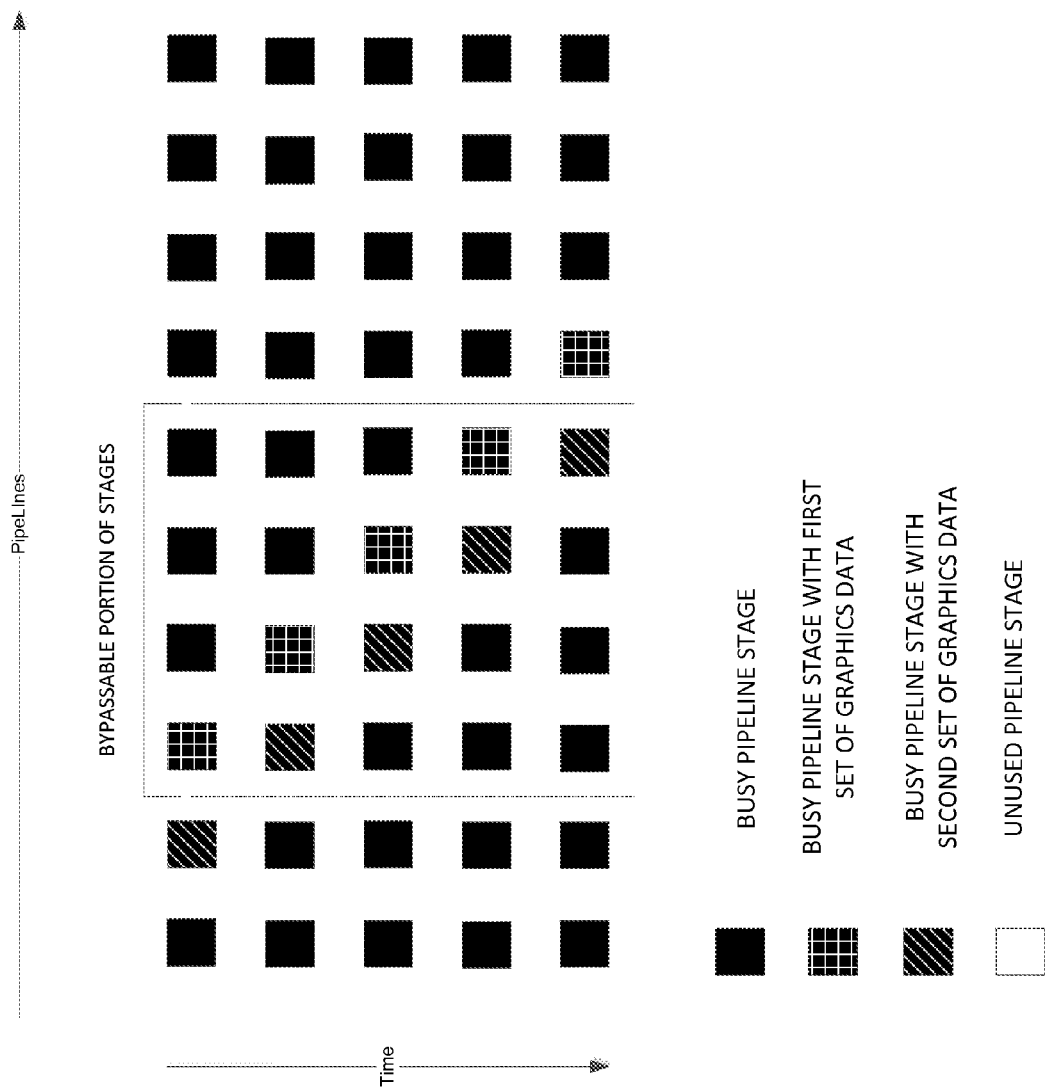
FIG. 7A and FIG. 7B are conceptual diagrams showing an example data bubble that may occur in graphics processing.
Figure 7B:
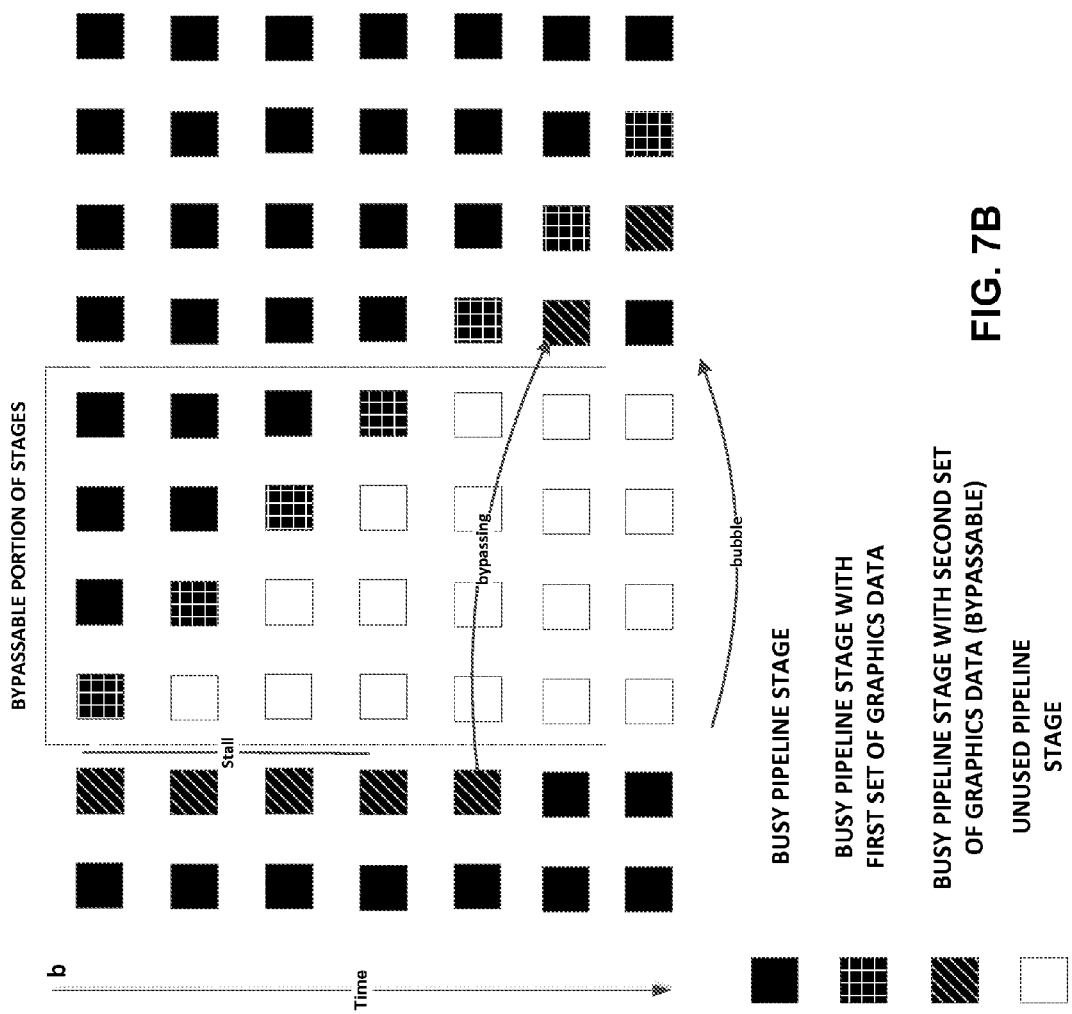

FIG. 7A and FIG. 7B are conceptual diagrams showing an example data bubble that may occur in graphics processing. As shown in FIG. 7A, each square represents a stage of a graphics pipeline. A middle section of the pipeline is a bypassable portion of stages. Each subsequent row of stages represents the pipeline at a different time. As shown in FIG. 7A, when no pipeline stages are bypassed, graphics data traverses the pipeline back-to-back. That is, at any one time, there are not unused pipeline stages. However, as shown in FIG. 7B, if a set of graphics data bypasses the bypassable portion of stages, a data bubble may occur whereby a portion of the pipeline stages are unused for a period of time. As shown in FIG. 7B, such a bubble may become larger if the graphics data that may bypass the bypassable portion of stages is stalled for a period of time before previous data has completed the bypassable portion of stages (e.g., in order to maintain in-order execution).

Accordingly, in another example of the disclosure, bypass controller 310 may further be configured to analyze instructions related to subsequent sets of graphics data and route the set of graphics data 302 based on the analysis. In this example, if the instructions related to processing the set of graphics data 302 require the function performed by bypassable portion of stages 300, bypass controller 310 will control multiplexer 308 to route the set of graphics data 302 through bypassable portion of stages 300.

If the instructions related to processing the set of graphics data 302 do not require the function performed by bypassable portion of stages 300, bypass controller 310 will control multiplexer 308 to route the set of graphics data 302 through shortcut circuit 314 only in the case that bypassable portion of stages 300 are not currently processing a previous set of graphics data (e.g., as indicated by bypass signals 306a-n), and in the case that an analysis of instructions related to subsequent sets of graphics data also do not require the function of bypassable portion of stages 300.

If the current set of graphics data do not require the functions performed by bypassable portion of stages 300, but bypass controller 310 determines that a subsequent set of graphics data does require the function of bypassable portion of stages 300, bypass controller 310 is configured to route the set of graphics data 302 through bypassable portion of stages 300. In this case, bypassable portion of stages 300 will be instructed to pass the set of graphics data 302 through unchanged.

In another example of the disclosure, data bubbles may be predicted based on the characteristics of previous data flows, and without considering instructions or any other information related to subsequent sets of graphics data. For example, bypass controller 310 may be configured to predict if a current set of graphics data may bypass the bypassable portion of stages 300 based on whether or not previous sets of graphics data bypassed the bypassable portion of stages 300. For example, if previous set(s) of graphics data bypassed the bypassable portion of stages 300, bypass controller 310 will control multiplexer 308 to route the set of graphics data 302 through shortcut circuit 314. If previous set(s) of graphics data did not bypass the bypassable portion of stages 300, bypass controller 310 will control multiplexer 308 to route the set of graphics data 302 through the bypassable portion of stages 300.

Figure 8A:
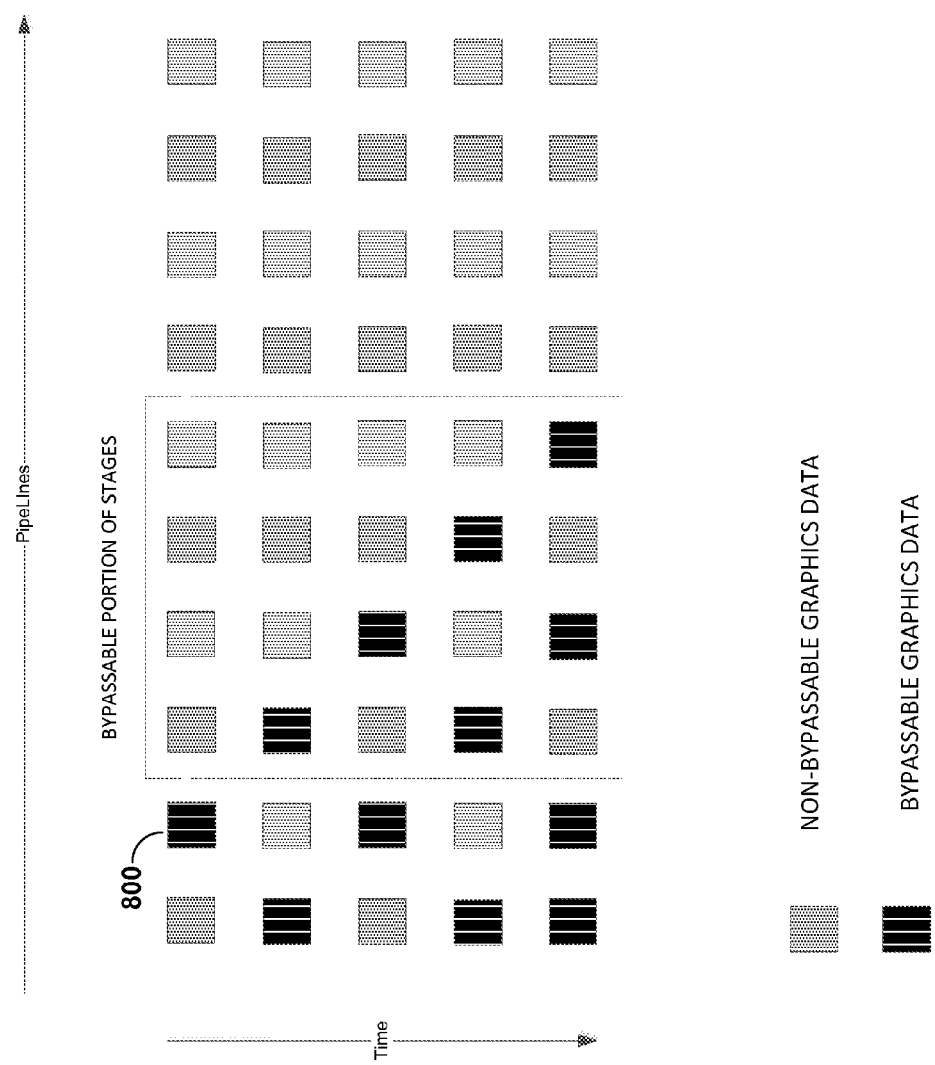
FIG. 8A and FIG. 8B are conceptual diagrams showing example data bubble prevention techniques according to the disclosure.
Figure 8B:
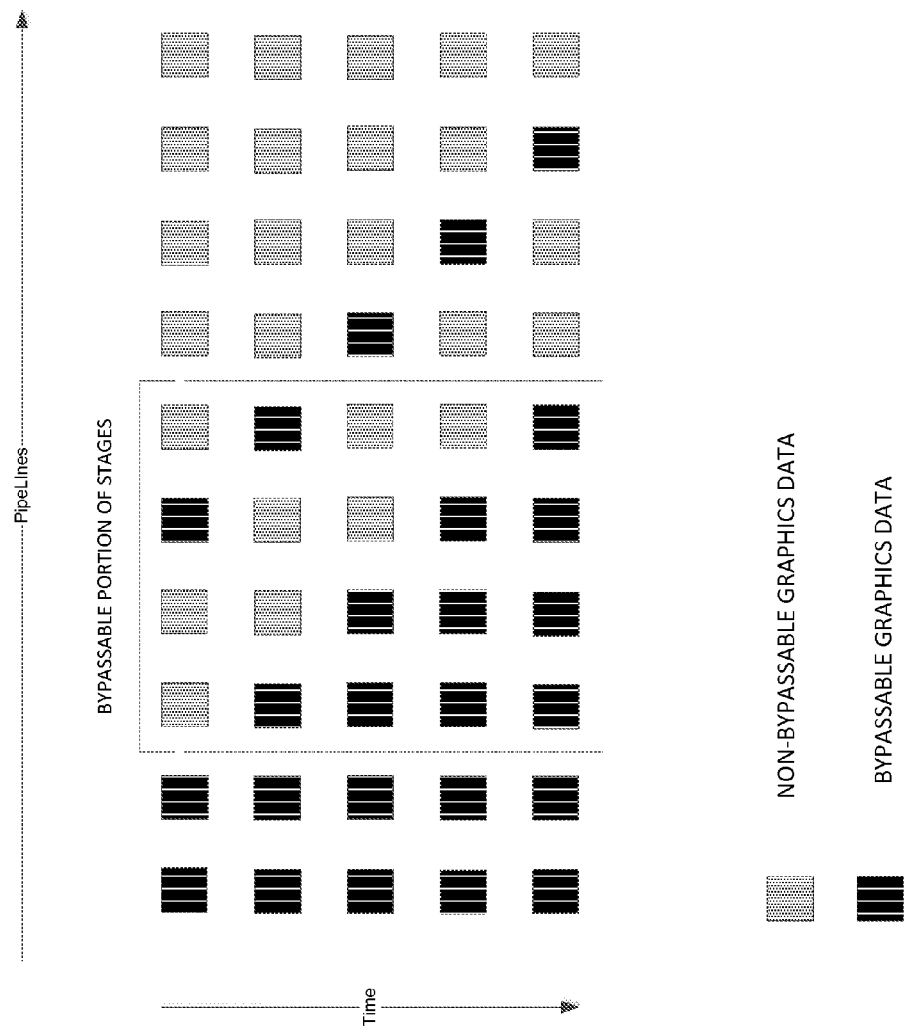

FIG. 8A and FIG. 8B are conceptual diagrams showing example data bubble prediction techniques according to the disclosure. As shown in FIG. 8A, an alternating sequence of non-bypassable graphics data (i.e., graphics data that may not bypass the bypassable portion of stages), and bypassable graphics data (i.e., graphics data that may bypass the bypassable portion of stages) is scheduled to move through the graphics pipeline.

As described above, bypass controller 310 may be configured to perform forward checking of instructions to determine whether or not a current set of graphics data should be routed through shortcut circuit 314. However, the availability of instructions or other attributes of the graphics data that indicates whether or not the current set of graphics data is bypassable may not be available may costly to obtain in terms of time and/or processing power. This is because a current set of graphics data may be created just prior to entering a graphics pipeline.

Accordingly, in another example of the disclosure, bypass controller 310 may be configured to predict whether or not a current set of graphics data may bypass the bypassable portion of stages based on whether or not previous sets of graphics data bypassed the bypassable portion of stages.

For example, as shown in FIG. 8, bypass controller 310 may be configured to route the first set of bypassable graphics data 800 through the bypassable portion of stages (i.e., not through shortcut circuit 314). This is because the previous sets of graphics data that traversed the pipeline were non-bypassable graphics data. As discussed above, each stage of the bypassable portion of stages may be configured to signal a bypass signal 306 to indicate if current data inside a pipeline stage is bypassable or not. Only when all graphics data inside the bypassable portion of stages is bypass able will bypass controller 310 be configured to enable bypassable graphics data to use the shortcut circuit 314.

This prediction technique uses history data of previous graphics data to determine when graphics data may bypass the bypassable portion of stages. For example, if the bypassable portion of stages is N stages long, bypass controller 310 may be configured to disallow any data to bypass the bypassable portion of stages until all N stages have signaled they bypass signal 306 to bypass controller 310 indicating that all data in the bypassable portion of stages is bypassable. FIG. 8B shows an example where, at the last time period, all data in the bypassable portion of stages is bypassable. Subsequent bypassable graphics data may then be routed to shortcut circuit 314. This technique allows for prediction of whether or not the pipeline is bypassable at very low cost.

Figure 10:
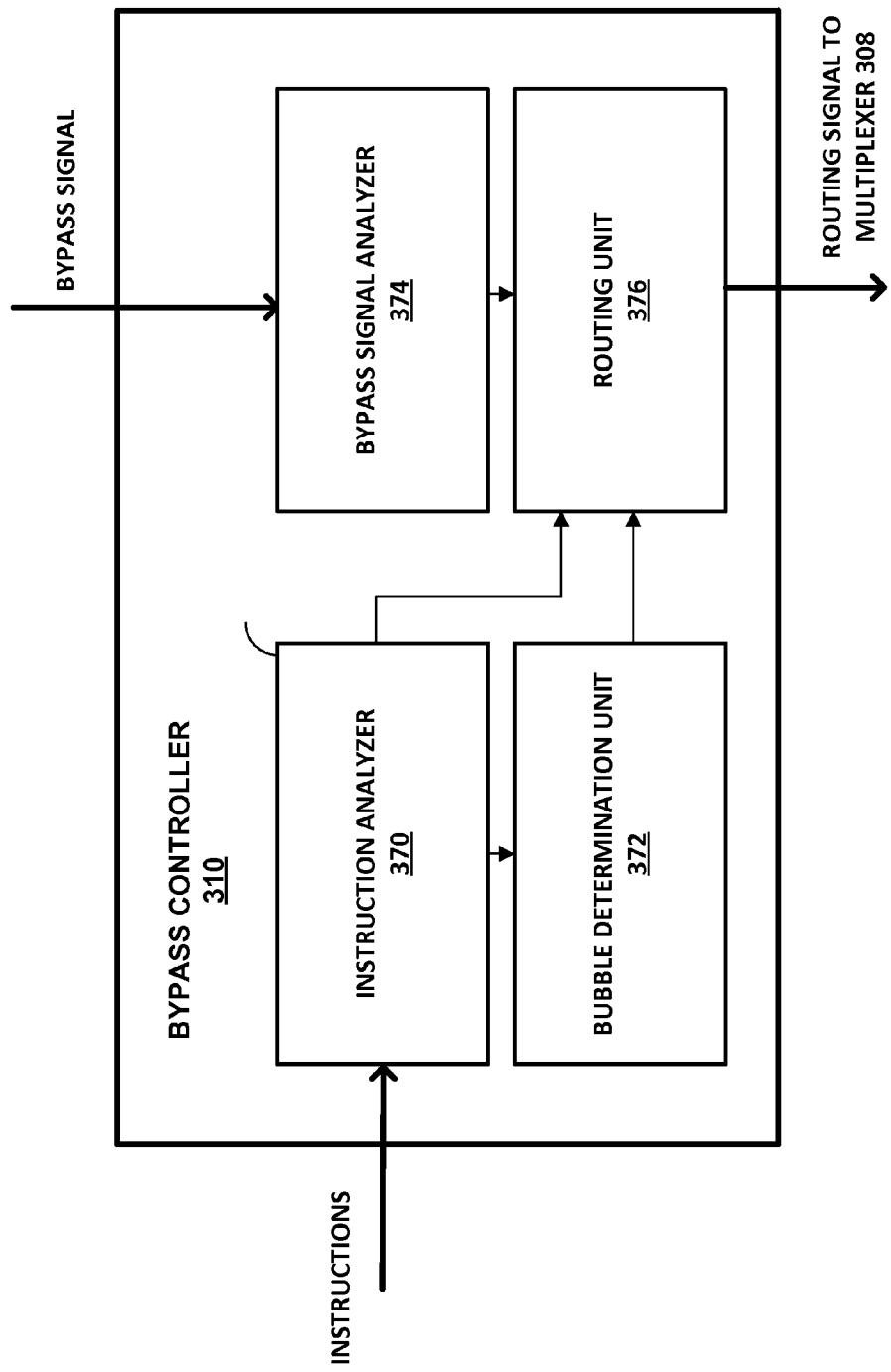
FIG. 10 is a block diagram showing an example bypass controller according to the techniques of this disclosure.

FIG. 10 is a block diagram showing an example bypass controller 310 according to the techniques of this disclosure. As shown in FIG. 10, one example bypass controller 310 may include an instruction analyzer 370, a bubble determination unit 372, a bypass signal analyzer 374, and a routing unit 376.

Instruction analyzer 370 may be configured to analyze instructions for one or more sets of graphics data to determine whether or not a particular set of graphics data is required to be processed by the function executed by a bypassable portion of stages of a fixed hardware pipeline. Instruction analyzer 370 may be configured to provide an indication to routing unit 376 that indicates whether or not a particular set of graphics data requires processing by the bypassable portion of stages. Instruction analyzer may also provide such an indication to bubble determination unit 372.

Bubble determination unit 372 is configured to analyze instructions for sets of graphics data that a subsequent to a current set of graphics data, and determine whether or not a data bubble will occur if the current set of graphics data is routed to shortcut circuit 314. For example, if instructions related to a subsequent set of graphics data require the use of the bypassable stages, bubble determination unit 372 may indicate to routing 376 that a data bubble may occur if a current set of graphics is routed to shortcut circuit 317. Likewise, if instructions related to a subsequent set of graphics data do not require the use of the bypassable stages, bubble determination unit 372 may indicate to routing 376 that a data bubble will not occur if a current set of graphics is routed to shortcut circuit 317.

In other examples, bubble determination unit 372 may be configured to determine whether or not data bubbles will occur using a prediction algorithm based on prior data flows. In this context, a data flow may represent a plurality of sets of graphics data processed through or around the bypassable stages. Bubble determination unit 372 may be configured to analyze previous examples of data being processed through or around the bypassable stages and identify characteristics of such flows that caused a data bubble. Bubble determination unit 372 may then predict future occurrences of data bubbles in situations where future data flows have the same characteristics, and indicate possible data bubbles to routing unit 376.

Bypass signal analyzer 374 is configured to receive and analyze bypass signals 306a-n from bypassable portion of stages 300. Again, bypass signals 306a-n indicate whether or not bypassable portion of stages 300 are currently processing a previous set of graphics data. Bypass signal analyzer 374 may pass an indication of whether or not bypassable portion of stages 300 are currently processing a previous set of graphics data to routing unit 376.

Routing unit 376 is configured to route current set of graphics data to one of bypassable portion of stages 300 or shortcut circuit 314 based on one or more criteria provided by instruction analyzer 370, bubble determination unit 372, and bypass signal analyzer 374. Again, the criteria may include one or more of an indication of whether current instructions related to the current set of graphics data requires the function performed by bypassable portion of stages 300, an indication of whether or not bypassable portion of stages 300 is current processing a previous set of graphics data, and in indication of whether or not routing the current set of graphics data to shortcut circuit 314 will result in a data bubble. FIGS. 9-12 depict various examples of routing decisions that may be made based on these criteria. Once a routing has been determined, routing unit 376 sends a signal to multiplexer 308 to route the current set of graphics data to one of bypassable portion of stages 300 or shortcut circuit 314.

In summary, this disclosure proposes an apparatus (e.g., GPU 12) configured to process graphics data. The apparatus may include a fixed hardware pipeline configured to execute one or more functions on a current set of graphics data. The fixed hardware pipeline may include a plurality of stages including a bypassable portion of the plurality of stages (e.g., bypassable portion of stages 300). The bypassable portion of the plurality of stages may include one or more bypassable stages.

The fixed hardware pipeline may further include a shortcut circuit (e.g., shortcut circuit 314) configured to route the current set of graphics data around the bypassable portion of the plurality of stages, and a controller (e.g., bypass controller 310) positioned before the bypassable portion of the plurality of stages, the controller configured to route the current set of graphics data to one of the shortcut circuit 314 or the bypassable portion of the plurality of stages. In one example of the disclosure the controller is configured to turn off power to the bypassable portion of the plurality of stages in the case that the controller routes the current set of graphics data to the shortcut circuit.

Figure 11:
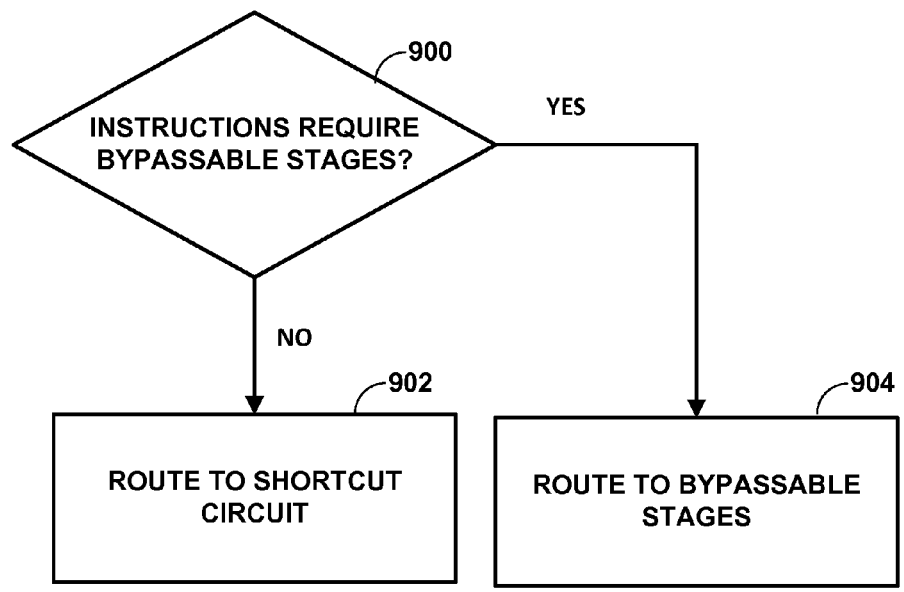
FIG. 11 is a flowchart illustrating an example method of the disclosure.

FIG. 11 is a flowchart illustrating an example method of the disclosure. In the example of FIG. 11, bypass controller 310 is configured to route the current set of graphics data based on a current function to be executed on the current set of graphics data. Bypass controller 310 is configured to determine if instructions related to the current set of graphics data require the function performed by bypassable portion of stages 300 (900). If yes, bypass controller 310 is configured to route the current set of graphics data to bypassable portion of stage 300 (904). If no, bypass controller 310 is configured to route the current set of graphics data to shortcut circuit 314 (902).

Figure 12:
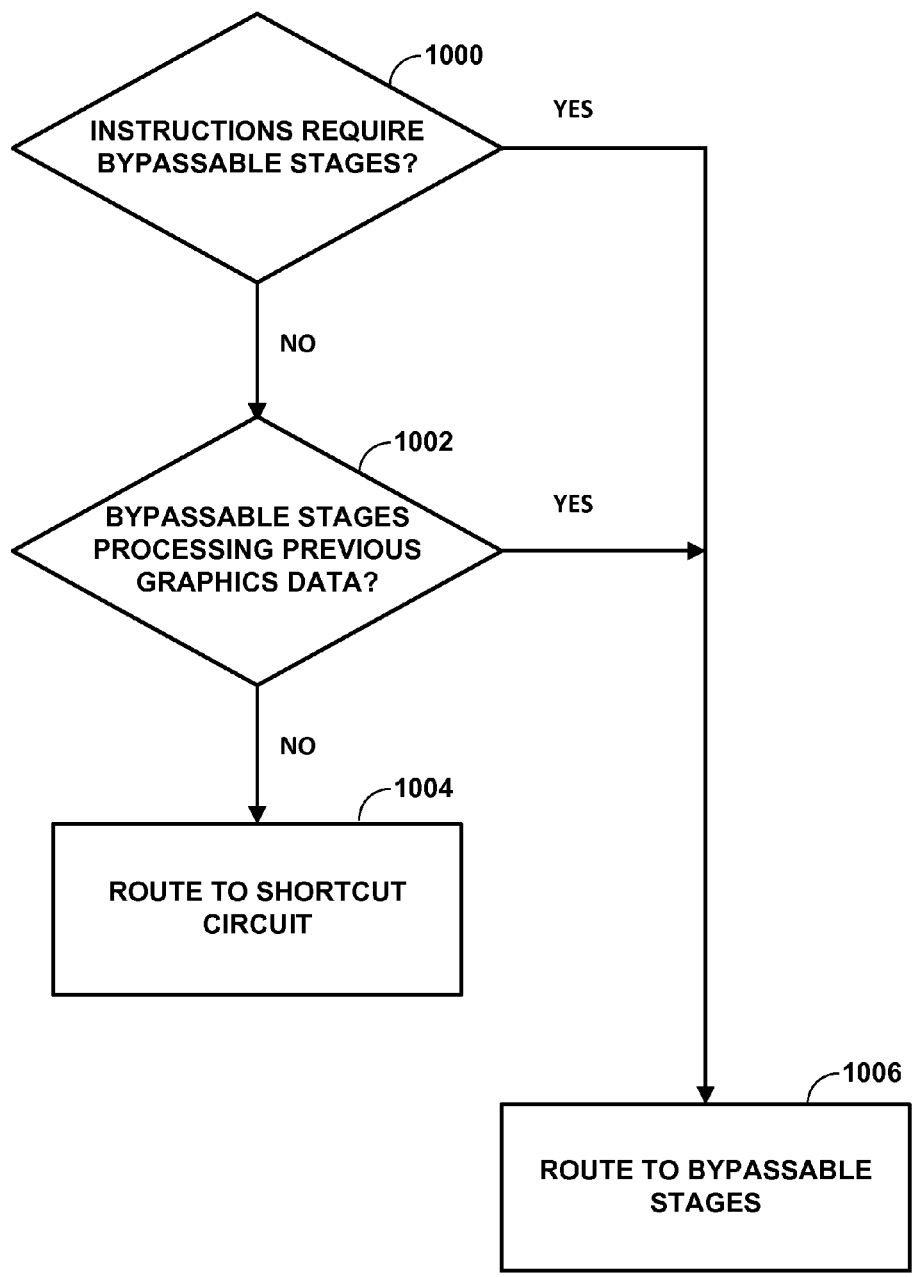
FIG. 12 is a flowchart illustrating another example method of the disclosure.

FIG. 12 is a flowchart illustrating another example method of the disclosure. In the example of FIG. 12, the bypassable portion of stages 300 includes one or more registers (e.g., corresponding to hardware logic units 304a-n) configured to store graphics data. The one or more registers are configured to send a signal (e.g., bypass signals 306a-n) to bypass controller 310 indicating whether or not the graphics data in the one or more registers is currently being processed by bypassable portion of stages 300. Further in the example of FIG. 12, bypass controller 310 is configured to route the current set of graphics data based both on instructions related to the current set of graphics data and the signal sent by the one or more registers.

Bypass controller 310 is configured to determine if instructions related to the current set of graphics data require the function performed by bypassable portion of stages 300 (1000). If yes, bypass controller 310 is configured to route the current set of graphics data to bypassable portion of stage 300 (1006). If no, bypass controller is further configured to determine if bypassable portion of stage 300 is currently processing a previous set of graphics data (1002). If yes, bypass controller 310 is configured to route the current set of graphics data to bypassable portion of stage 300 (1006). If no, bypass controller 310 is configured to route the current set of graphics data to shortcut circuit 314 (1004).

Figure 13:
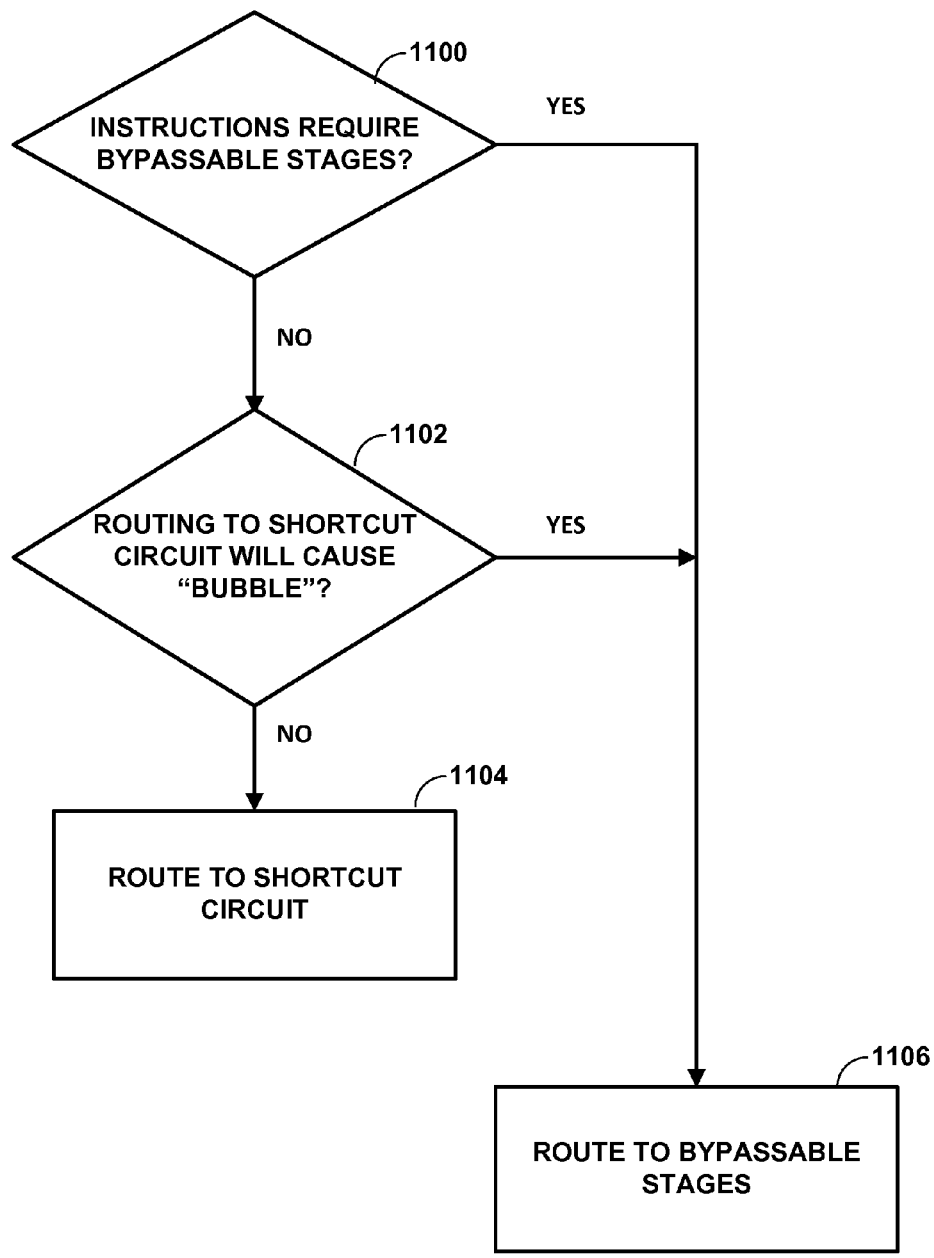
FIG. 13 is a flowchart illustrating another example method of the disclosure.

FIG. 13 is a flowchart illustrating another example method of the disclosure. In the example of FIG. 13, bypass controller 310 is further configured to determine if a subsequent set of graphics data will be processed by bypassable portion of stage 300. In this example, bypass controller 310 is configured to route the current set of graphics data based both on instructions related to the current set of graphics data and the determination of whether or not a subsequent set of graphics data will be processed by bypassable portion of stage 300.

Bypass controller 310 is configured to determine if instructions related to the current set of graphics data require the function performed by bypassable portion of stages 300 (1100). If yes, bypass controller 310 is configured to route the current set of graphics data to bypassable portion of stage 300 (1106). If no, bypass controller is further configured to determine if, through analysis of instructions related to a subsequent set of graphics instructions, routing the current set of graphics data to shortcut circuit 314 will cause a data bubble (1102). If yes, bypass controller 310 is configured to route the current set of graphics data to bypassable portion of stage 300 (1106). If no, bypass controller 310 is configured to route the current set of graphics data to shortcut circuit 314 (1104).

Figure 14:
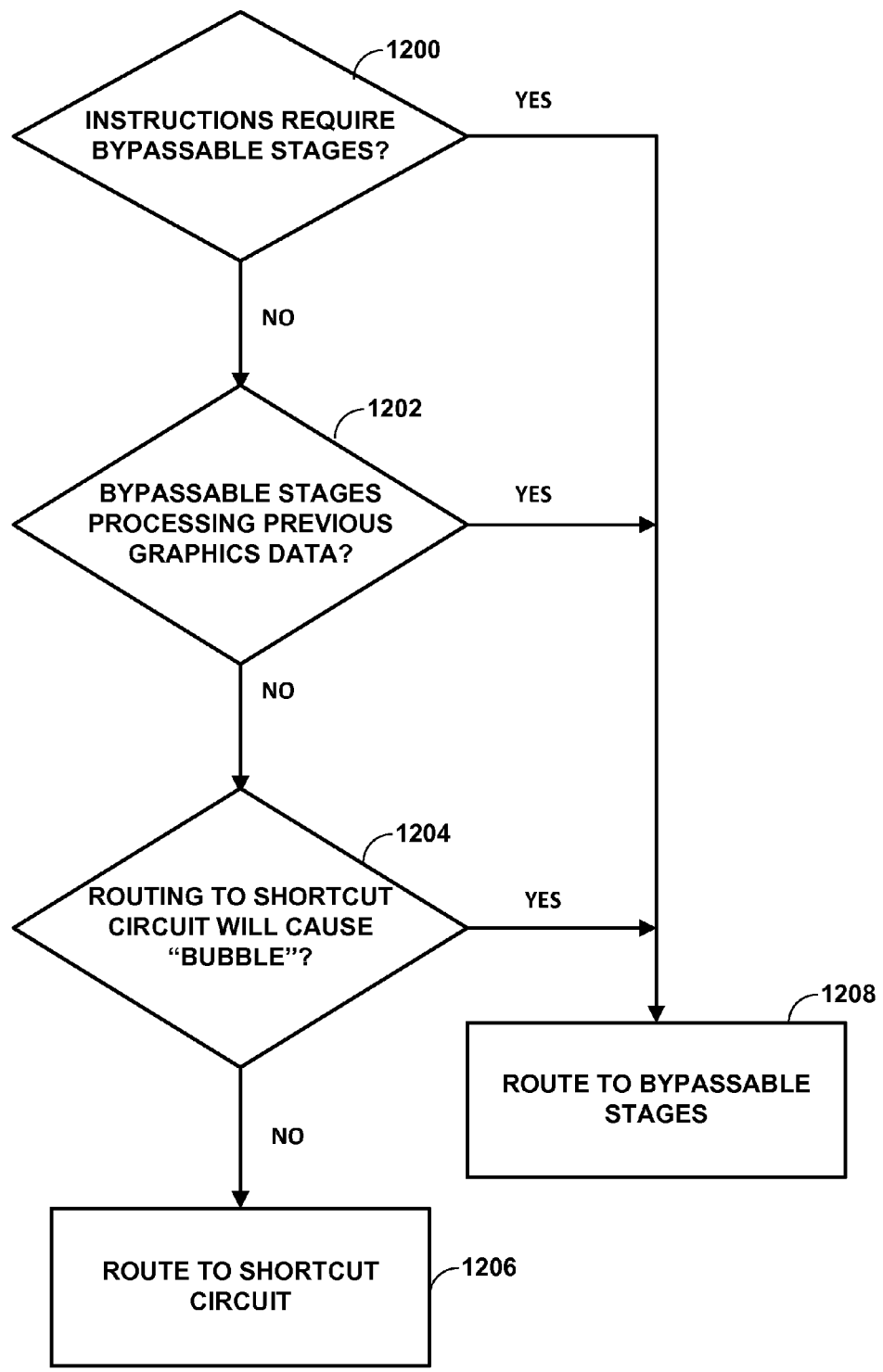
FIG. 14 is a flowchart illustrating another example method of the disclosure.

FIG. 14 is a flowchart illustrating another example method of the disclosure. In the example of FIG. 14, bypass controller 310 is configured to route a current set of graphics data based on all three of instructions related to the current set of graphics data bypass signals sent by one or more registers of bypassable portion of stage 300, and a determination of whether or not a subsequent set of graphics data will be processed by bypassable portion of stage 300.

Bypass controller 310 is configured to determine if instructions related to the current set of graphics data require the function performed by bypassable portion of stages 300 (1200). If yes, bypass controller 310 is configured to route the current set of graphics data to bypassable portion of stage 300 (1208).

If no, bypass controller is further configured to determine if bypassable portion of stage 300 is currently processing a previous set of graphics data (1202). If yes, bypass controller 310 is configured to route the current set of graphics data to bypassable portion of stage 300 (1208).

If no, bypass controller is further configured to determine if, through analysis of instructions related to a subsequent set of graphics instructions, routing the current set of graphics data to shortcut circuit 314 will cause a data bubble (1204). If yes, bypass controller 310 is configured to route the current set of graphics data to bypassable portion of stage 300 (1208). If no, bypass controller 310 is configured to route the current set of graphics data to shortcut circuit 314 (1206).

In one or more examples, the functions described above may be implemented in hardware, software, firmware, or any combination thereof. If implemented in software, the functions may be stored as one or more instructions or code on an article of manufacture comprising a non-transitory computer-readable medium. Computer-readable media may include computer data storage media. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage, or other magnetic storage devices, flash memory, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The code may be executed by one or more processors, such as one or more DSPs, general purpose microprocessors, ASICs, FPGAs, or other equivalent integrated or discrete logic circuitry. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. An apparatus configured to process graphics data, the apparatus comprising:
a fixed hardware pipeline configured to execute one or more functions on a current set of graphics data, the fixed hardware pipeline comprising a plurality of stages including a bypassable portion of the plurality of stages;
a shortcut circuit configured to route the current set of graphics data around the bypassable portion of the plurality of stages; and
a controller positioned before the bypassable portion of the plurality of stages, the controller configured to:
analyze instructions for a subsequent set of graphics data that is to be processed after the current set of graphics data; and
selectively route the current set of graphics data to one of the shortcut circuit or the bypassable portion of the plurality of stages based, at least in part, on the analysis of the instructions for the subsequent set of graphics data.

2. The apparatus of claim 1, wherein the controller is further configured to turn off power to the bypassable portion of the plurality of stages in the case that the controller routes the current set of graphics data to the shortcut circuit.

3. The apparatus of claim 1, wherein the bypassable portion of the plurality of stages comprises one or more bypassable stages.

4. The apparatus of claim 1, wherein the controller is further configured to route the current set of graphics data based on a current function to be executed on the current set of graphics data.

5. The apparatus of claim 4,
wherein the controller is further configured to route the current set of graphics data to the bypassable portion in the case that the current function requires the bypassable portion, and
wherein the controller is further configured to route the current set of graphics data to the shortcut circuit in the case that the current function does not require the bypassable portion.

6. The apparatus of claim 4, wherein the bypassable portion of the plurality of stages comprises one or more registers configured to store graphics data, the one or more registers configured to send a signal to the controller indicating whether or not the graphics data in the one or more registers is currently being processed by the bypassable portion.

7. The apparatus of claim 6,
wherein the controller is further configured to route the current set of graphics data to the bypassable portion in the case that the current function requires the bypassable portion or in the case that the signal indicates that the graphics data in the one or more registers is currently being processed by the bypassable portion, and
wherein the controller is further configured to route the current set of graphics data to the shortcut circuit in the case that the current function does not require the bypassable portion and the signal indicates that the graphics data in the one or more registers is not currently being processed by the bypassable portion.

8. The apparatus of claim 6,
wherein the controller is further configured to route the current set of graphics data based on the signal from the one or more registers.

9. The apparatus of claim 8,
wherein the controller is further configured to route the current set of graphics data to the bypassable portion in the case that the current function requires the bypassable portion,
wherein the controller is further configured to route the current set of graphics data to the bypassable portion in the case that the instructions for the subsequent set of graphics data do require the bypassable portion,
wherein the controller is further configured to route the current set of graphics data to the bypassable portion in the case that the signal indicates that the graphics data in the one or more registers is currently being processed by the bypassable portion, and
wherein the controller is further configured to route the current set of graphics data to the shortcut circuit in the case that the current function does not require the bypassable portion, the instructions for the subsequent set of graphics data do not require the bypassable portion, and the signal indicates that the graphics data in the one or more registers is not currently being processed by the bypassable portion.

10. The apparatus of claim 4, wherein the controller is further configured to determine if a subsequent set of graphics data will be processed by the bypassable portion, and wherein the controller is further configured to route the current set of graphics data based on the current function to be executed on the current set of graphics data and the determination if the subsequent set of graphics data will be processed by the bypassable portion.

11. The apparatus of claim 10,
wherein the controller is further configured to determine if the subsequent set of graphics data will be processed by the bypassable portion by analyzing instructions for the subsequent set of graphics data, and
wherein the controller is further configured to route the current set of graphics data based on the current function to be executed on the current set of graphics data and the analysis of the instructions for the subsequent set of graphics data.

12. The apparatus of claim 11,
wherein the controller is further configured to route the current set of graphics data to the bypassable portion in the case that the current function requires the bypassable portion,
wherein the controller is further configured to route the current set of graphics data to the bypassable portion in the case that the instructions for the subsequent set of graphics data do require the bypassable portion, and
wherein the controller is further configured to route the current set of graphics data to the shortcut circuit in the case that the current function does not require the bypassable portion and the instructions for the subsequent set of graphics data also do not require the bypassable portion.

13. A method for processing graphics data, the method comprising:
processing a current set of graphics data with a fixed hardware pipeline configured to execute one or more functions on the current set of graphics data, the fixed hardware pipeline comprising a plurality of stages including a bypassable portion of the plurality of stages, and a shortcut circuit configured to route the current set of graphics data around the bypassable portion of the plurality of stages;

analyzing instructions for a subsequent set of graphics data that is to be processed after the current set of graphics data; and selectively routing, with a controller positioned before the bypassable portion of the plurality of stages, the current set of graphics data to one of the shortcut circuit or the bypassable portion of the plurality of stages based, at least in part, on the analysis of the instructions for the subsequent set of graphics data.

14. The method of claim 13, further comprising:
turning off power to the bypassable portion of the plurality of stages in the case that the current set of graphics data is routed to the shortcut circuit.

15. The method of claim 13, wherein the bypassable portion of the plurality of stages comprises one or more bypassable stages.

16. The method of claim 13, wherein routing the current set of graphics data comprises routing the current set of graphics data based on a current function to be executed on the current set of graphics data.

17. The method of claim 16, further comprising:
routing the current set of graphics data to the bypassable portion in the case that the current function requires the bypassable portion; and
routing the current set of graphics data to the shortcut circuit in the case that the current function does not require the bypassable portion.

18. The method of claim 16, wherein the bypassable portion of the plurality of stages comprises one or more registers configured to store graphics data, the method further comprising:
sending, from the one or more registers, a signal to the controller indicating whether or not the graphics data in the one or more registers is currently being processed by the bypassable portion.

19. The method of claim 18, further comprising:
routing the current set of graphics data to the bypassable portion in the case that the current function requires the bypassable portion or in the case that the signal indicates that the graphics data in the one or more registers is currently being processed by the bypassable portion; and
routing the current set of graphics data to the shortcut circuit in the case that the current function does not require the bypassable portion and the signal indicates that the graphics data in the one or more registers is not currently being processed by the bypassable portion.

20. The method of claim 18, further comprising:
routing the current set of graphics data based on the signal from the one or more registers.

21. The method of claim 20, further comprising:
routing the current set of graphics data to the bypassable portion in the case that the current function requires the bypassable portion;
routing the current set of graphics data to the bypassable portion in the case that the instructions for the subsequent set of graphics data do require the bypassable portion;
routing the current set of graphics data to the bypassable portion in the case that the signal indicates that the graphics data in the one or more registers is currently being processed by the bypassable portion; and
routing the current set of graphics data to the shortcut circuit in the case that the current function does not require the bypassable portion, the instructions for the subsequent set of graphics data do not require the bypassable portion, and the signal indicates that the graphics data in the one or more registers is not currently being processed by the bypassable portion.

22. The method of claim 16, further comprising:
determining if a subsequent set of graphics data will be processed by the bypassable portion; and
routing the current set of graphics data based on the current function to be executed on the current set of graphics data and the determination if the subsequent set of graphics data will be processed by the bypassable portion.

23. The method of claim 22, further comprising:
determining if the subsequent set of graphics data will be processed by the bypassable portion by analyzing instructions for the subsequent set of graphics data; and
routing the current set graphics data based on the current function to be executed on the current set of graphics data and the analysis of the instructions for the subsequent set of graphics data.

24. The method of claim 23, further comprising:
routing the current set of graphics data to the bypassable portion in the case that the current function requires the bypassable portion;
routing the current set of graphics data to the bypassable portion in the case that the instructions for the subsequent set of graphics data do require the bypassable portion; and
routing the current set of graphics data to the shortcut circuit in the case that the current function does not require the bypassable portion and the instructions for the subsequent set of graphics data also do not require the bypassable portion.

25. An apparatus configured to process graphics data, the apparatus comprising:
means for processing a current set of graphics data with a fixed hardware pipeline configured to execute one or more functions on the current set of graphics data, the fixed hardware pipeline comprising a plurality of stages including a bypassable portion of the plurality of stages, and a shortcut circuit configured to route the current set of graphics data around the bypassable portion of the plurality of stages;
means for analyzing instructions for a subsequent set of graphics data that is to be processed after the current set of graphics data; and
means for selectively routing the current set of graphics data to one of the shortcut circuit or the bypassable portion of the plurality of stages based, at least in part, on the analysis of the instructions for the subsequent set of graphics data.

26. The apparatus of claim 25, wherein the means for routing the current set of graphics data comprises means for routing the current set of graphics data based on a current function to be executed on the current set of graphics data.

27. The apparatus of claim 26, further comprising:
means for routing the current set of graphics data to the bypassable portion in the case that the current function requires the bypassable portion; and
means for routing the current set of graphics data to the shortcut circuit in the case that the current function does not require the bypassable portion.

28. A non-transitory computer-readable storage medium storing instructions that, when executed, cause one or more processors of a device configured to process graphics data to:

process a current set of graphics data with a fixed hardware pipeline configured to execute one or more functions on the current set of graphics data, the fixed hardware pipeline comprising a plurality of stages including a bypassable portion of the plurality of stages, and a shortcut circuit configured to route the current set of graphics data around the bypassable portion of the plurality of stages;

analyze instructions for a subsequent set of graphics data that is to be processed after the current set of graphics data; and selectively route the current set of graphics data to one of the shortcut circuit or the bypassable portion of the plurality of stages based, at least in part, on the analysis of the instructions for the subsequent set of graphics data.

29. The non-transitory computer-readable storage medium of claim 28, wherein the one or more processors are further configured to route the current set of graphics data based on a current function to be executed on the current set of graphics data.

30. The non-transitory computer-readable storage medium of claim 26, wherein the one or more processors are further configured to:

route the current set of graphics data to the bypassable portion in the case that the current function requires the bypassable portion; and route the current set of graphics data to the shortcut circuit in the case that the current function does not require the bypassable portion.

* * * * *